(12) United States Patent
Carlsson

(10) Patent No.: US 11,100,138 B2
(45) Date of Patent: Aug. 24, 2021

(54) NETWORK REPRESENTATION FOR EVOLUTION OF CLUSTERS AND GROUPS

(71) Applicant: Ayasdi AI LLC, Los Altos, CA (US)

(72) Inventor: Gunnar Carlsson, Stanford, CA (US)

(73) Assignee: Ayasdi AI LLC, Redwood City, CA (US)

( * ) Notice: Subject to any disclaimer, the term of this patent is extended or adjusted under 35 U.S.C. 154(b) by 922 days.

(21) Appl. No.: 15/262,900

(22) Filed: Sep. 12, 2016

(65) Prior Publication Data
US 2017/0075981 A1    Mar. 16, 2017

Related U.S. Application Data

(60) Provisional application No. 62/217,392, filed on Sep. 11, 2015.

(51) Int. Cl.
G06F 16/28      (2019.01)
G06F 16/955    (2019.01)

(52) U.S. Cl.
CPC .......... *G06F 16/285* (2019.01); *G06F 16/955* (2019.01)

(58) Field of Classification Search
CPC .............................. G06F 16/285; G06F 16/955
USPC ......................................................... 707/737
See application file for complete search history.

(56) References Cited

U.S. PATENT DOCUMENTS

| | | | | |
|---|---|---|---|---|
| 2009/0175538 A1* | 7/2009 | Bronstein | ........... | G06F 16/7847 382/173 |
| 2010/0313157 A1* | 12/2010 | Carlsson | ............... | G06F 16/287 715/769 |
| 2015/0117713 A1* | 4/2015 | Zheng | ....................... | G06K 9/46 382/103 |
| 2015/0254370 A1 | 9/2015 | Sexton et al. | | |
| 2015/0324448 A1* | 11/2015 | Qiu | ....................... | G06F 16/245 707/738 |
| 2016/0267397 A1* | 9/2016 | Carlsson | ................ | G16H 50/20 |

FOREIGN PATENT DOCUMENTS

| | | | | |
|---|---|---|---|---|
| WO | 2013087711 | | 6/2013 | |
| WO | WO-2013087711 A2 * | | 6/2013 | ............... H04Q 9/00 |

OTHER PUBLICATIONS

International Application No. PCT/US2016/051336, International Search Report and Written Opinion dated Nov. 18, 2016.

* cited by examiner

*Primary Examiner* — Ashish Thomas
*Assistant Examiner* — Abdullah A Daud
(74) *Attorney, Agent, or Firm* — Ahmann Kloke LLP

(57) ABSTRACT

An example method includes receiving a data set, each data point in the data set being associated with an indication of time, and a distance function, determining overlapping intervals over a time period range, identifying subsets of data in each overlapping interval based on the indications of time, applying the distance function to each subset of data to identify groups, constructing a node for each group to create a plurality of nodes, determining if two nodes of the plurality of nodes in adjacent time periods are connected by scoring shared data point membership between the two nodes and comparing a score of the shared data point membership to a threshold, and displaying at least two nodes with an indication of time, the two nodes being connected by a line based on the comparison of the score and the threshold.

17 Claims, 17 Drawing Sheets

NETWORK REPRESENTATION FOR EVOLUTION OF CLUSTERS AND GROUPS

CROSS-REFERENCE TO RELATED APPLICATION

The present application claims priority to U.S. Provisional Patent Application Ser. No. 62/217,392 filed Sep. 11, 2015 and entitled "Dynamic Clustering," the entirety of which is incorporated herein by reference.

BACKGROUND

1. Field of the Invention

Embodiments of the present invention(s) are directed to determining changes of groups of data points from time dependent data and more particularly to providing information regarding changes of groups of data points from time dependent data.

2. Related Art

As the collection and storage data has increased, there is an increased need to analyze and make sense of large amounts of data. Examples of large datasets may be found in financial services companies, oil expiration, biotech, and academia. Unfortunately, previous methods of analysis of large multidimensional datasets tend to be insufficient (if possible at all) to identify important relationships and may be computationally inefficient.

In one example, previous methods of analysis often use clustering. Clustering is often too blunt an instrument to identify important relationships in the data. Similarly, previous methods of linear regression, projection pursuit, principal component analysis, and multidimensional scaling often do not reveal important relationships. Existing linear algebraic and analytic methods are too sensitive to large scale distances and, as a result, lose detail.

Further, even if the data is analyzed, sophisticated experts are often necessary to interpret and understand the output of previous methods. Although some previous methods allow graphs depicting some relationships in the data, the graphs are not interactive and require considerable time for a team of such experts to understand the relationships. Further, the output of previous methods does not allow for exploratory data analysis where the analysis can be quickly modified to discover new relationships. Rather, previous methods require the formulation of a hypothesis before testing.

SUMMARY OF THE INVENTION(S)

In various embodiments, a non-transitory computer readable medium comprises executable instructions. The instructions are executable by a processor to perform a method. The method may comprise receiving a data set, each data point in the data set being associated with an indication of time, and a distance function to be utilized on the data points of the data set, determining overlapping intervals over a time period range, identifying subsets of data in each overlapping interval based, at least in part, on the indications of time, applying the distance function to each subset of data to identify groups, constructing a node for each group to create a plurality of nodes, determining if two nodes of the plurality of nodes in adjacent time periods are connected by scoring shared data point membership between the two nodes of the plurality of nodes and comparing a score of the shared data point membership to a threshold, and displaying at least two nodes of the plurality of nodes with an indication of a passage of time, the two nodes being connected by a line based on the comparison of the score of the shared data point membership between the two nodes of the plurality of nodes to the threshold.

In some embodiments, the indications of time are time stamps. In some embodiments, determining overlapping intervals over a time period range may be determined based on a number of overlapping intervals and a resolution value received from a user. In various embodiments, determining overlapping intervals over a time period range is determined based on a number of overlapping intervals and a resolution value, the number of overlapping intervals being determined based on the received data set.

Applying the distance function to each subset of data to identify groups may comprise performing topological data analysis to identify one or more nodes in each subset of data. In some embodiments, applying the distance function to each subset of data to identify groups comprises performing topological data analysis to identify one or more nodes in each subset of data. It will be appreciated that scoring shared data point membership between the two nodes of the plurality of nodes comprises determining a Jaccard score of the shared data point membership between the two nods of the plurality of nodes.

In various embodiments, the time period range is received from a user. In some embodiments, the tie period range is shorter than a range of time indicated by the indications of time. The method may also further comprise filtering the data set based on one or more features and wherein each node is constructed based on the data set after filtering.

An example method may comprise receiving a data set, each data point in the data set being associated with an indication of time, and a distance function to be utilized on the data points of the data set, determining overlapping intervals over a time period range, identifying subsets of data in each overlapping interval based, at least in part, on the indications of time, applying the distance function to each subset of data to identify groups, constructing a node for each group to create a plurality of nodes, determining if two nodes of the plurality of nodes in adjacent time periods are connected by scoring shared data point membership between the two nodes of the plurality of nodes and comparing a score of the shared data point membership to a threshold, and displaying at least two nodes of the plurality of nodes with an indication of a passage of time, the two nodes being connected by a line based on the comparison of the score of the shared data point membership between the two nodes of the plurality of nodes to the threshold.

An example system may comprise a processor and memory. The memory may include instructions to configure the processor to receive a data set, each data point in the data set being associated with an indication of time, and a distance function to be utilized on the data points of the data set, determine overlapping intervals over a time period range, identify subsets of data in each overlapping interval based, at least in part, on the indications of time, apply the distance function to each subset of data to identify groups, construct a node for each group to create a plurality of nodes, determine if two nodes of the plurality of nodes in adjacent time periods are connected by scoring shared data point membership between the two nodes of the plurality of nodes and comparing a score of the shared data point membership to a threshold, and displaying at least two nodes of the plurality of nodes with an indication of a passage of time, the two nodes being connected by a line based on the comparison of the score of the shared data point membership between the two nodes of the plurality of nodes to the threshold.

DETAILED DESCRIPTION OF THE DRAWINGS

Some embodiments described herein may be a part of the subject of Topological Data Analysis (TDA). TDA is an area of research which has produced methods for studying point cloud data sets from a geometric point of view. Other data analysis techniques use "approximation by models" of various types. For example, regression methods model the data as the graph of a function in one or more variables. Unfortunately, certain qualitative properties (which one can readily observe when the data is two-dimensional) may be of a great deal of importance for understanding, and these features may not be readily represented within such models.

Figure 1A:
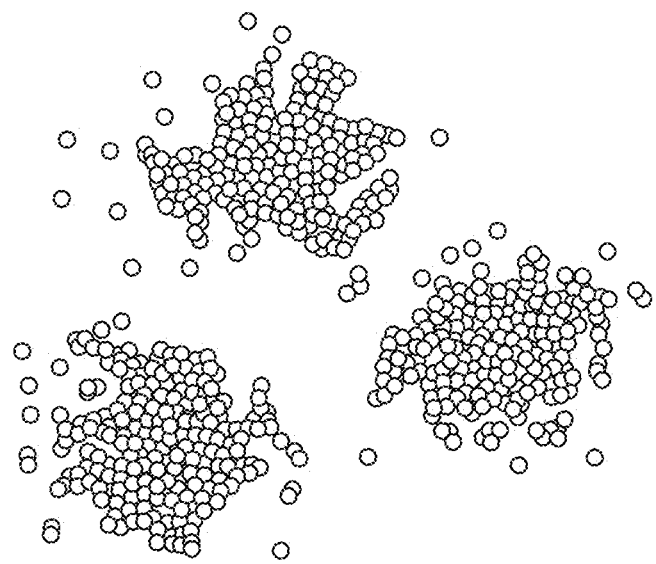
FIG. 1A is an example graph representing data that appears to be divided into three disconnected groups.

FIG. 1A is an example graph representing data that appears to be divided into three disconnected groups. In this example, the data for this graph may be associated with various physical characteristics related to different population groups or biomedical data related to different forms of a disease. Seeing that the data breaks into groups in this fashion can give insight into the data, once one understands what characterizes the groups.

Figure 1B:
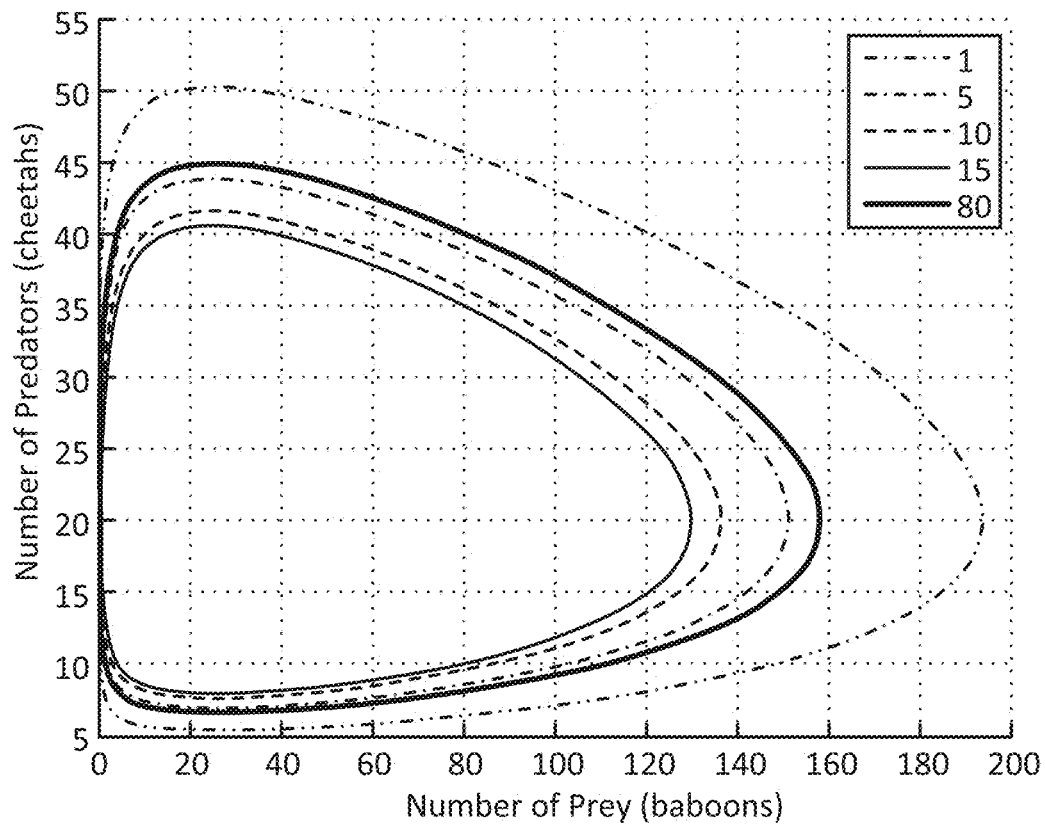
FIG. 1B is an example graph representing data set obtained from a Lotka-Volterra equation modeling the populations of predators and prey over time.

FIG. 1B is an example graph representing data set obtained from a Lotka-Volterra equation modeling the populations of predators and prey over time. From FIG. 1B, one observation about this data is that it is arranged in a loop. The loop is not exactly circular, but it is topologically a circle. The exact form of the equations, while interesting, may not be of as much importance as this qualitative observation which reflects the fact that the underlying phenomenon is recurrent or periodic. When looking for periodic or recurrent phenomena, methods may be developed which can detect the presence of loops without defining explicit models. For example, periodicity may be detectable without having to first develop a fully accurate model of the dynamics.

Figure 1C:
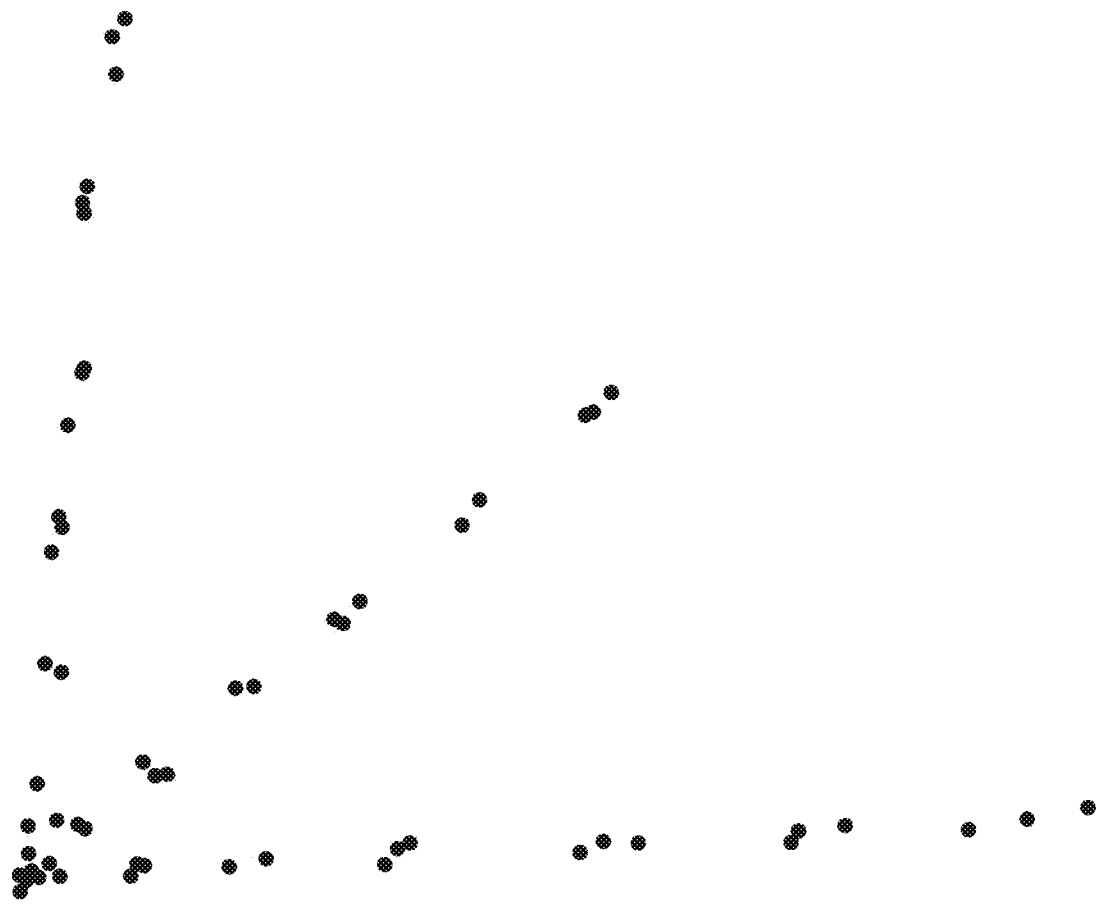
FIG. 1C is an example graph of data sets whereby the data does not break up into disconnected groups, but instead has a structure in which there are lines (or flares) emanating from a central group.

FIG. 1C is an example graph of data sets whereby the data does not break up into disconnected groups, but instead has a structure in which there are lines (or flares) emanating from a central group. In this case, the data also suggests the presence of three distinct groups, but the connectedness of the data does not reflect this. This particular data that is the basis for the example graph in FIG. 1C arises from a study of single nucleotide polymorphisms (SNPs).

In each of the examples above, aspects of the shape of the data are relevant in reflecting information about the data. Connectedness (the simplest property of shape) reflects the presence of a discrete classification of the data into disparate groups. The presence of loops, another simple aspect of shape, often reflects periodic or recurrent behavior. Finally, in the third example, the shape containing flares suggests a classification of the data descriptive of ways in which phenomena can deviate from the norm, which would typically be represented by the central core. These examples support the idea that the shape of data (suitably defined) is an important aspect of its structure, and that it is therefore important to develop methods for analyzing and understanding its shape. The part of mathematics which concerns itself with the study of shape is called topology, and topological data analysis attempts to adapt methods for studying shape which have been developed in pure mathematics to the study of the shape of data, suitably defined.

One question is how notions of geometry or shape are translated into information about point clouds, which are, after all, finite sets? What we mean by shape or geometry can come from a dissimilarity function or metric (e.g., a non-negative, symmetric, real-valued function d on the set of pairs of points in the data set which may also satisfy the triangle inequality, and $d(x; y)=0$ if and only if $x=y$). Such functions exist in profusion for many data sets. For example, when the data comes in the form of a numerical matrix, where the rows correspond to the data points and the columns are the fields describing the data, the n-dimensional Euclidean distance function is natural when there are n fields. Similarly, in this example, there are Pearson correlation distances, cosine distances, and other choices.

When the data is not Euclidean, for example if one is considering genomic sequences, various notions of distance may be defined using measures of similarity based on Basic Local Alignment Search Tool (BLAST) type similarity scores. Further, a measure of similarity can come in non-numeric forms, such as social networks of friends or similarities of hobbies, buying patterns, tweeting, and/or professional interests. In any of these ways the notion of shape may be formulated via the establishment of a useful notion of similarity of data points.

One of the advantages of TDA is that it may depend on nothing more than such a notion, which is a very primitive or low-level model. It may rely on many fewer assumptions than standard linear or algebraic models, for example. Further, the methodology may provide new ways of visualizing and compressing data sets, which facilitate understanding and monitoring data. The methodology may enable study of interrelationships among disparate data sets and/or multiscale/multiresolution study of data sets. Moreover, the methodology may enable interactivity in the analysis of data, using point and click methods.

TDA may be a very useful complement to more traditional methods, such as Principal Component Analysis (PCA), multidimensional scaling, and hierarchical clustering. These existing methods are often quite useful, but suffer from significant limitations. PCA, for example, is an essentially linear procedure and there are therefore limits to its utility in highly non-linear situations. Multidimensional scaling is a method which is not intrinsically linear, but can in many situations wash out detail, since it may overweight large distances. In addition, when metrics do not satisfy an intrinsic flatness condition, it may have difficulty in faithfully representing the data. Hierarchical clustering does exhibit multiscale behavior, but represents data only as disjoint clusters, rather than retaining any of the geometry of the data set. In all four cases, these limitations matter for many varied kinds of data.

We now summarize example properties of an example construction, in some embodiments, which may be used for representing the shape of data sets in a useful, understandable fashion as a finite graph:

The input may be a collection of data points equipped in some way with a distance or dissimilarity function, or other description. This can be given implicitly when the data is in the form of a matrix, or explicitly as a matrix of distances or even the generating edges of a mathematical network.

One construction may also use one or more lens functions (i.e., real valued functions on the data). Lens function(s) may depend directly on the metric. For example, lens function(s) might be the result of a density estimator or a measure of centrality or data depth. Lens function(s) may, in some embodiments, depend on a particular representation of the data, as when one uses the first one or two coordinates of a principal component or multidimensional scaling analysis. In some embodiments, the lens function(s) may be columns which expert knowledge identifies as being intrinsically interesting, as in cholesterol levels and BMI in a study of heart disease.

In some embodiments, the construction may depend on a choice of two or more processing parameters, resolution, and gain. Increase in resolution typically results in more nodes and an increase in the gain increases the number of edges in a visualization and/or graph in a reference space as further described herein.

The output may be, for example, a visualization (e.g., a display of connected nodes or "network") or simplicial complex. One specific combinatorial formulation in one embodiment may be that the vertices form a finite set, and then the additional structure may be a collection of edges (unordered pairs of vertices) which are pictured as connections in this network.

In various embodiments, a system for handling, analyzing, and visualizing data using drag and drop methods as opposed to text based methods is described herein. Philosophically, data analytic tools are not necessarily regarded as "solvers," but rather as tools for interacting with data. For example, data analysis may consist of several iterations of a process in which computational tools point to regions of interest in a data set. The data set may then be examined by people with domain expertise concerning the data, and the data set may then be subjected to further computational analysis. In some embodiments, methods described herein provide for going back and forth between mathematical constructs, including interactive visualizations (e.g., graphs), on the one hand and data on the other.

In one example of data analysis in some embodiments described herein, an example clustering tool is discussed which may be more powerful than existing technology, in that one can find structure within clusters and study how clusters change over a period of time or over a change of scale or resolution.

An example interactive visualization tool (e.g., a visualization module which is further described herein) may produce combinatorial output in the form of a graph which can be readily visualized. In some embodiments, the example interactive visualization tool may be less sensitive to changes in notions of distance than current methods, such as multidimensional scaling.

Some embodiments described herein permit manipulation of the data from a visualization. For example, portions of the data which are deemed to be interesting from the visualization can be selected and converted into database objects, which can then be further analyzed. Some embodiments described herein permit the location of data points of interest within the visualization, so that the connection between a given visualization and the information the visualization represents may be readily understood.

Figure 2:
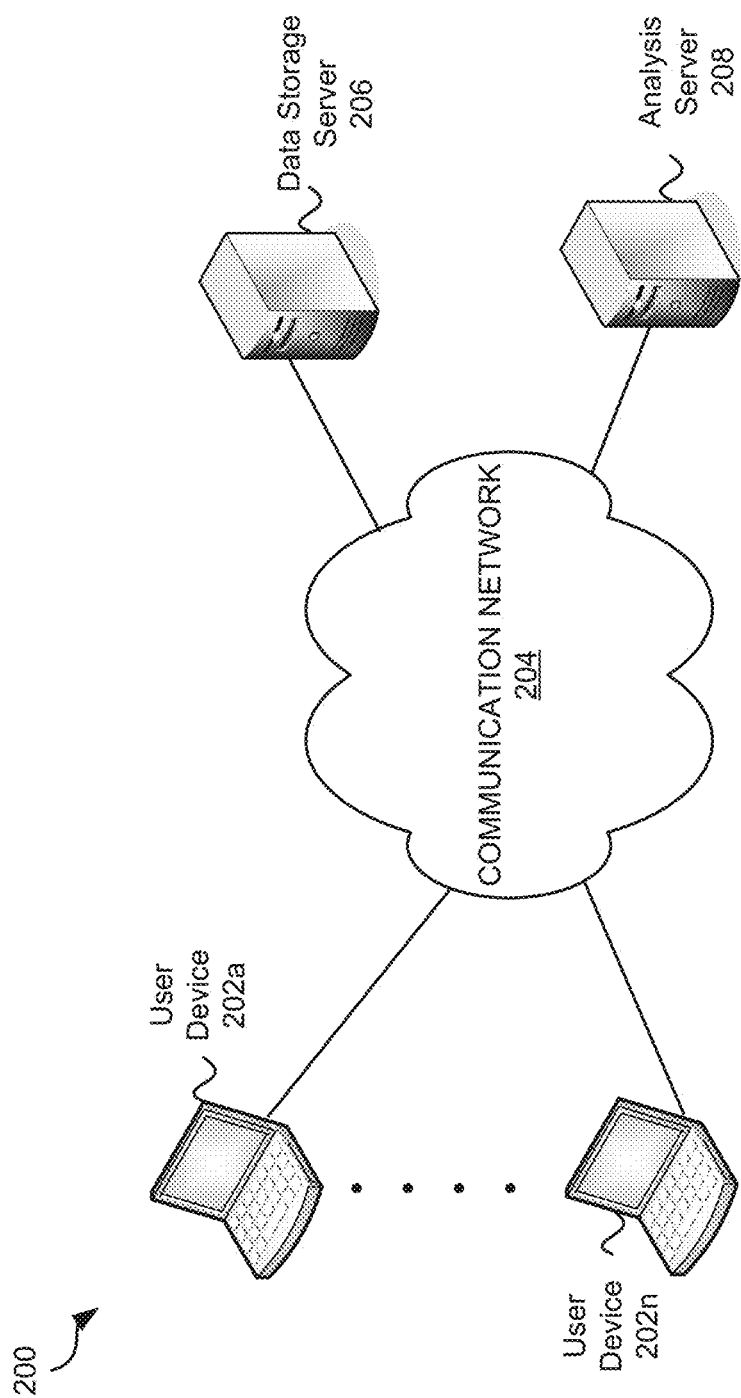
FIG. 2 is an example environment in which embodiments may be practiced.

FIG. 2 is an example environment 200 in which embodiments may be practiced. In various embodiments, data analysis and interactive visualization may be performed locally (e.g., with software and/or hardware on a local digital device), across a network (e.g., via cloud computing), or a combination of both. In many of these embodiments, a data structure is accessed to obtain the data for the analysis, the analysis is performed based on properties and parameters selected by a user, and an interactive visualization is generated and displayed. There are many advantages between performing all or some activities locally and many advantages of performing all or some activities over a network.

Environment 200 comprises user devices 202a-202n, a communication network 204, data storage server 206, and analysis server 208. Environment 200 depicts an embodiment wherein functions are performed across a network. In this example, the user(s) may take advantage of cloud computing by storing data in a data storage server 206 over a communication network 204. The analysis server 208 may perform analysis and generation of an interactive visualization.

User devices 202a-202n may be any digital devices. A digital device is any device that comprises memory and a processor. Digital devices are further described in FIG. 2. The user devices 202a-202n may be any kind of digital device that may be used to access, analyze and/or view data including, but not limited to a desktop computer, laptop, notebook, or other computing device.

In various embodiments, a user, such as a data analyst, may generate a database or other data structure with the user device 202a to be saved to the data storage server 206. The user device 202a may communicate with the analysis server 208 via the communication network 204 to perform analysis, examination, and visualization of data within the database.

The user device 202a may comprise a client program for interacting with one or more applications on the analysis server 208. In other embodiments, the user device 202a may communicate with the analysis server 208 using a browser or other standard program. In various embodiments, the user device 202a communicates with the analysis server 208 via a virtual private network. It will be appreciated that that communication between the user device 202a, the data storage server 206, and/or the analysis server 208 may be encrypted or otherwise secured.

The communication network 204 may be any network that allows digital devices to communicate. The communication network 204 may be the Internet and/or include LAN and WANs. The communication network 204 may support wireless and/or wired communication.

The data storage server 206 is a digital device that is configured to store data. In various embodiments, the data storage server 206 stores databases and/or other data structures. The data storage server 206 may be a single server or a combination of servers. In one example the data storage server 206 may be a secure server wherein a user may store data over a secured connection (e.g., via https). The data may be encrypted and backed-up. In some embodiments, the data storage server 206 is operated by a third-party such as Amazon's S3 service.

The database or other data structure may comprise large high-dimensional datasets. These datasets are traditionally very difficult to analyze and, as a result, relationships within the data may not be identifiable using previous methods. Further, previous methods may be computationally inefficient.

The analysis server 208 is a digital device that may be configured to analyze data. In various embodiments, the analysis server may perform many functions to interpret, examine, analyze, and display data and/or relationships within data. In some embodiments, the analysis server 208 performs, at least in part, topological analysis of large datasets applying metrics, filters, and resolution parameters chosen by the user. The analysis is further discussed in FIG. 8 herein.

The analysis server 208 may generate an interactive visualization of the output of the analysis. The interactive visualization allows the user to observe and explore relationships in the data. In various embodiments, the interactive visualization allows the user to select nodes comprising data that has been clustered. The user may then access the underlying data, perform further analysis (e.g., statistical analysis) on the underlying data, and manually reorient the graph(s) (e.g., structures of nodes and edges described herein) within the interactive visualization. The analysis server 208 may also allow for the user to interact with the data, see the graphic result. The interactive visualization is further discussed in FIGS. 9-11.

In some embodiments, the analysis server 208 interacts with the user device(s) 202a-202n over a private and/or secure communication network. The user device 202a may comprise a client program that allows the user to interact with the data storage server 206, the analysis server 208, another user device (e.g., user device 202n), a database, and/or an analysis application executed on the analysis server 208.

Those skilled in the art will appreciate that all or part of the data analysis may occur at the user device 202a. Further, all or part of the interaction with the visualization (e.g., graphic) may be performed on the user device 202a.

Although two user devices 202a and 202n are depicted, those skilled in the art will appreciate that there may be any number of user devices in any location (e.g., remote from each other). Similarly, there may be any number of communication networks, data storage servers, and analysis servers.

Cloud computing may allow for greater access to large datasets (e.g., via a commercial storage service) over a faster connection. Further, it will be appreciated that services and computing resources offered to the user(s) may be scalable.

Figure 3:
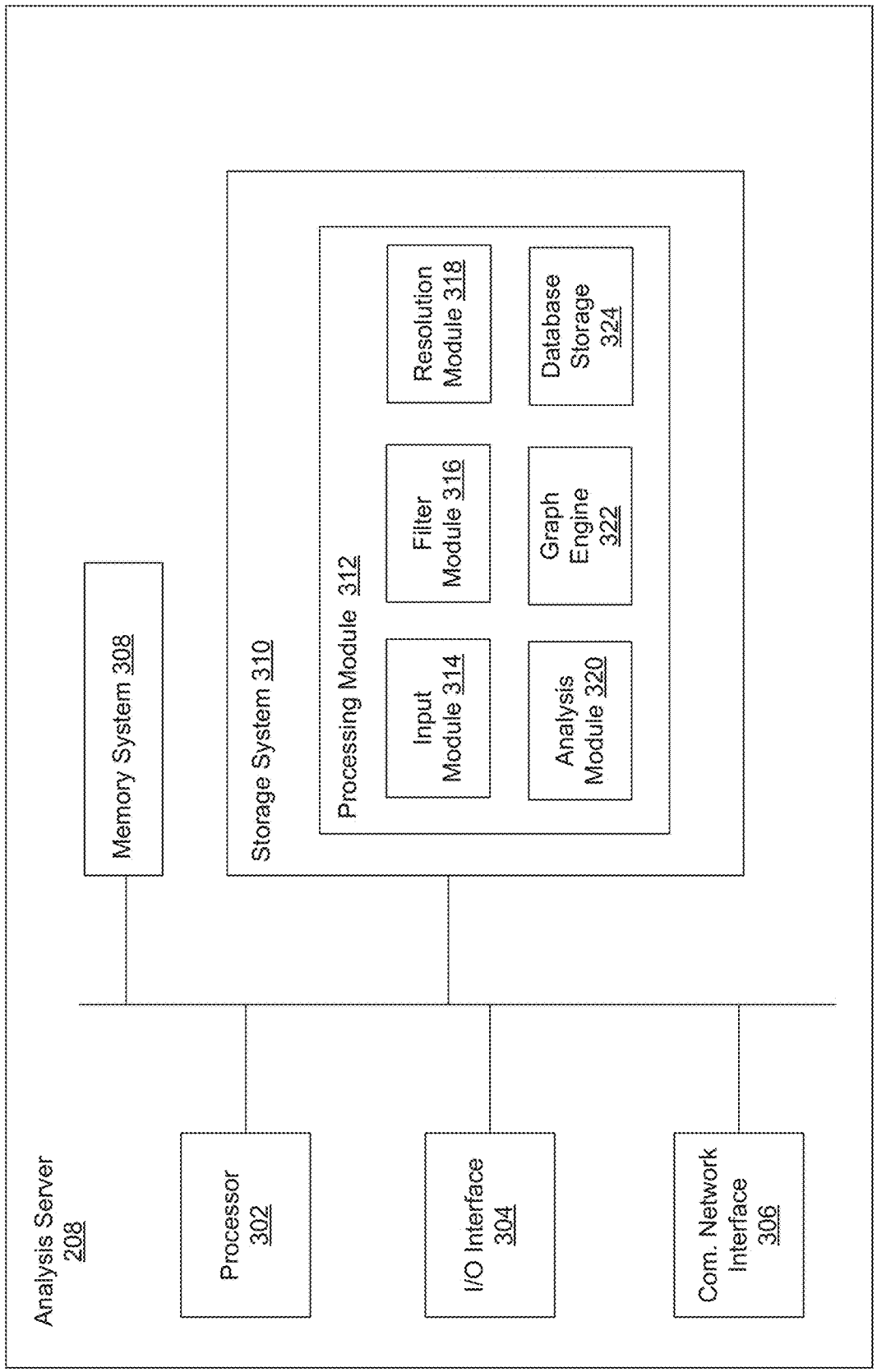
FIG. 3 is a block diagram of an example analysis server.

FIG. 3 is a block diagram of an example analysis server 208. In example embodiments, the analysis server 208 comprises a processor 302, input/output (I/O) interface 304, a communication network interface 306, a memory system 308, a storage system 310, and a processing module 312. The processor 302 may comprise any processor or combination of processors with one or more cores.

The input/output (I/O) interface 304 may comprise interfaces for various I/O devices such as, for example, a keyboard, mouse, and display device. The example communication network interface 306 is configured to allow the analysis server 208 to communication with the communication network 204 (see FIG. 2). The communication network interface 306 may support communication over an Ethernet connection, a serial connection, a parallel connection, and/or an ATA connection. The communication network interface 306 may also support wireless communication (e.g., 802.11 a/b/g/n, WiMax, LTE, WiFi). It will be apparent to those skilled in the art that the communication network interface 306 can support many wired and wireless standards.

The memory system 308 may be any kind of memory including RAM, ROM, or flash, cache, virtual memory, etc. In various embodiments, working data is stored within the memory system 308. The data within the memory system 308 may be cleared or ultimately transferred to the storage system 310.

The storage system 310 includes any storage configured to retrieve and store data. Some examples of the storage system 310 include flash drives, hard drives, optical drives, and/or magnetic tape. Each of the memory system 308 and the storage system 310 comprises a computer-readable medium, which stores instructions (e.g., software programs) executable by processor 302.

The storage system 310 comprises a plurality of modules utilized by embodiments of discussed herein. A module may be hardware, software (e.g., including instructions executable by a processor), or a combination of both. In one embodiment, the storage system 310 comprises a processing module 312 which comprises an input module 314, a filter module 316, a resolution module 318, an analysis module 320, a graph engine 322, and database storage 324. Alternative embodiments of the analysis server 208 and/or the storage system 310 may comprise more, less, or functionally equivalent components and modules.

The input module 314 may be configured to receive commands and preferences from the user device 202a. In various examples, the input module 314 receives selections from the user which will be used to perform the analysis. The output of the analysis may be an interactive visualization.

The input module 314 may provide the user a variety of interface windows allowing the user to select and access a database, choose fields associated with the database, choose a metric, choose one or more filters, and identify resolution parameters for the analysis. In one example, the input module 314 receives a database identifier and accesses a large multidimensional database. The input module 314 may scan the database and provide the user with an interface window allowing the user to identify an ID field. An ID field is an identifier for each data point. In one example, the identifier is unique. The same column name may be present in the table from which filters are selected. After the ID field is selected, the input module 314 may then provide the user with another interface window to allow the user to choose one or more data fields from a table of the database.

Although interactive windows may be described herein, it will be appreciated that any window, graphical user interface, and/or command line may be used to receive or prompt a user or user device 202a for information.

The filter module 316 may subsequently provide the user with an interface window to allow the user to select a metric to be used in analysis of the data within the chosen data fields. The filter module 316 may also allow the user to select and/or define one or more filters.

The resolution module 218 may allow the user to select a resolution, including filter parameters. In one example, the user enters a number of intervals and a percentage overlap for a filter.

The analysis module 320 may perform data analysis based on the database and the information provided by the user. In various embodiments, the analysis module 320 performs an algebraic topological analysis to identify structures and relationships within data and clusters of data. It will be appreciated that the analysis module 320 may use parallel algorithms or use generalizations of various statistical techniques (e.g., generalizing the bootstrap to zig-zag methods) to increase the size of data sets that can be processed. The analysis is further discussed in FIG. 8. It will be appreciated that the analysis module 320 is not limited to algebraic topological analysis but may perform any analysis.

The graph engine 322 generates an interactive visualization including the output from the analysis module 320. The interactive visualization allows the user to see all or part of the analysis graphically. The interactive visualization also allows the user to interact with the visualization. For example, the user may select portions of a graph from within the visualization to see and/or interact with the underlying data and/or underlying analysis. The user may then change the parameters of the analysis (e.g., change the metric, filter(s), or resolution(s)) which allows the user to visually identify relationships in the data that may be otherwise undetectable using prior means. The interactive visualization is further described in FIGS. 9-11.

The database storage 324 is configured to store all or part of the database that is being accessed. In some embodiments, the database storage 324 may store saved portions of the database. Further, the database storage 324 may be used to store user preferences, parameters, and analysis output thereby allowing the user to perform many different functions on the database without losing previous work.

It will be appreciated that that all or part of the processing module 312 may be at the user device 202a or the database storage server 206. In some embodiments, all or some of the functionality of the processing module 312 may be performed by the user device 202a.

In various embodiments, systems and methods discussed herein may be implemented with one or more digital devices. In some examples, some embodiments discussed herein may be implemented by a computer program (instructions) executed by a processor. The computer program may provide a graphical user interface. Although such a computer program is discussed, it will be appreciated that embodiments may be performed using any of the following, either alone or in combination, including, but not limited to, a computer program, multiple computer programs, firmware, and/or hardware.

A module and/or engine may include any processor or combination of processors. In some examples, a module and/or engine may include or be a part of a processor, digital signal processor (DSP), application specific integrated circuit (ASIC), an integrated circuit, and/or the like. In various embodiments, the modules and/or engine may be software or firmware.

Figure 4:
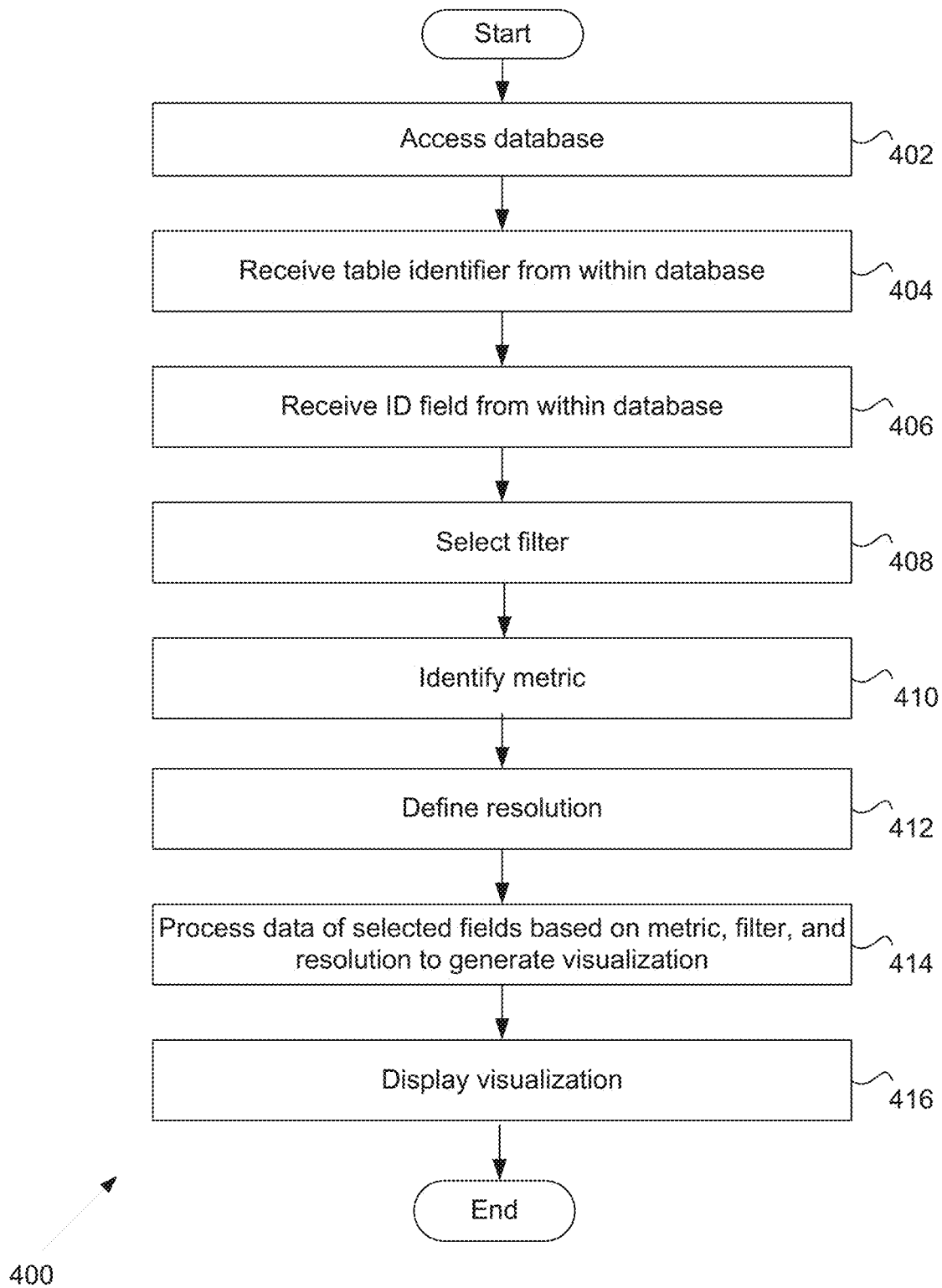
FIG. 4 is a flow chart depicting an example method of dataset analysis and visualization in some embodiments.

FIG. 4 is a flow chart 400 depicting an example method of dataset analysis and visualization in some embodiments. In step 402, the input module 314 accesses a database. The database may be any data structure containing data (e.g., a very large dataset of multidimensional data). In some embodiments, the database may be a relational database. In some examples, the relational database may be used with MySQL, Oracle, Microsoft SQL Server, Aster nCluster, Teradata, and/or Vertica. It will be appreciated that the database may not be a relational database.

In some embodiments, the input module 314 receives a database identifier and a location of the database (e.g., the data storage server 206) from the user device 202a (see FIG. 2). The input module 314 may then access the identified database. In various embodiments, the input module 314 may read data from many different sources, including, but not limited to MS Excel files, text files (e.g., delimited or CSV), Matlab .mat format, or any other file.

In some embodiments, the input module 314 receives an IP address or hostname of a server hosting the database, a username, password, and the database identifier. This information (herein referred to as "connection information") may be cached for later use. It will be appreciated that the database may be locally accessed and that all, some, or none of the connection information may be required. In one example, the user device 202a may have full access to the database stored locally on the user device 202a so the IP address is unnecessary. In another example, the user device 202a may already have loaded the database and the input module 314 merely begins by accessing the loaded database.

In various embodiments, the identified database stores data within tables. A table may have a "column specification" which stores the names of the columns and their data types. A "row" in a table, may be a tuple with one entry for each column of the correct type. In one example, a table to store employee records might have a column specification such as:

- employee_id primary key int (this may store the employee's ID as an integer, and uniquely identifies a row)
- age int
- gender char(1) (gender of the employee may be a single character either M or F)
- salary double (salary of an employee may be a floating point number)
- name varchar (name of the employee may be a variable-length string)

In this example, each employee corresponds to a row in this table. Further, the tables in this example relational database are organized into logical units called databases. An analogy to file systems is that databases can be thought of as folders and files as tables. Access to databases may be controlled by the database administrator by assigning a username/password pair to authenticate users.

Once the database is accessed, the input module 314 may allow the user to access a previously stored analysis or to begin a new analysis. If the user begins a new analysis, the input module 314 may provide the user device 202a with an interface window allowing the user to identify a table from within the database. In one example, the input module 314 provides a list of available tables from the identified database.

In step 404, the input module 314 receives a table identifier identifying a table from within the database. The input module 314 may then provide the user with a list of available ID fields from the table identifier. In step 406, the input module 314 receives the ID field identifier from the user and/or user device 202a. The ID field is, in some embodiments, the primary key.

Having selected the primary key, the input module 314 may generate a new interface window to allow the user to select data fields for analysis. In step 408, the input module 314 receives data field identifiers from the user device 202a. The data within the data fields may be later analyzed by the analysis module 320.

In step 410, the filter module 316 identifies a metric. In some embodiments, the filter module 316 and/or the input module 314 generates an interface window allowing the user of the user device 202a options for a variety of different metrics and filter preferences. The interface window may be a drop down menu identifying a variety of distance metrics to be used in the analysis. Metric options may include, but are not limited to, Euclidean, DB Metric, variance normalized Euclidean, and total normalized Euclidean. The metric and the analysis are further described herein.

In step 412, the filter module 316 selects one or more filters. In some embodiments, the user selects and provides filter identifier(s) to the filter module 316. The role of the filters in the analysis is also further described herein. The filters, for example, may be user defined, geometric, or based on data which has been pre-processed. In some embodiments, the data based filters are numerical arrays which can assign a set of real numbers to each row in the table or each point in the data generally.

A variety of geometric filters may be available for the user to choose. Geometric filters may include, but are not limited to:
  Density
  L1 Eccentricity
  L-infinity Eccentricity
  Witness based Density
  Witness based Eccentricity
  Eccentricity as distance from a fixed point
  Approximate Kurtosis of the Eccentricity In step 414, the resolution module 218 defines the resolution to be used with a filter in the analysis. The resolution may comprise a number of intervals and an overlap parameter. In various embodiments, the resolution module 218 allows the user to adjust the number of intervals and overlap parameter (e.g., percentage overlap) for one or more filters.

In step 416, the analysis module 320 processes data of selected fields based on the metric, filter(s), and resolution(s) to generate the visualization. This process is discussed in FIG. 8.

In step 418, the visualization module 322 displays the interactive visualization. In various embodiments, the visualization may be rendered in two or three dimensional space. The visualization module 322 may use an optimization algorithm for an objective function which is correlated with good visualization (e.g., the energy of the embedding). The visualization may show a collection of nodes corresponding to each of the partial clusters in the analysis output and edges connecting them as specified by the output. The interactive visualization is further discussed in FIGS. 9-11.

Although many examples discuss the input module 314 as providing interface windows, it will be appreciated that all or some of the interface may be provided by a client on the user device 202a. Further, in some embodiments, the user device 202a may be running all or some of the processing module 212.

Figure 5:
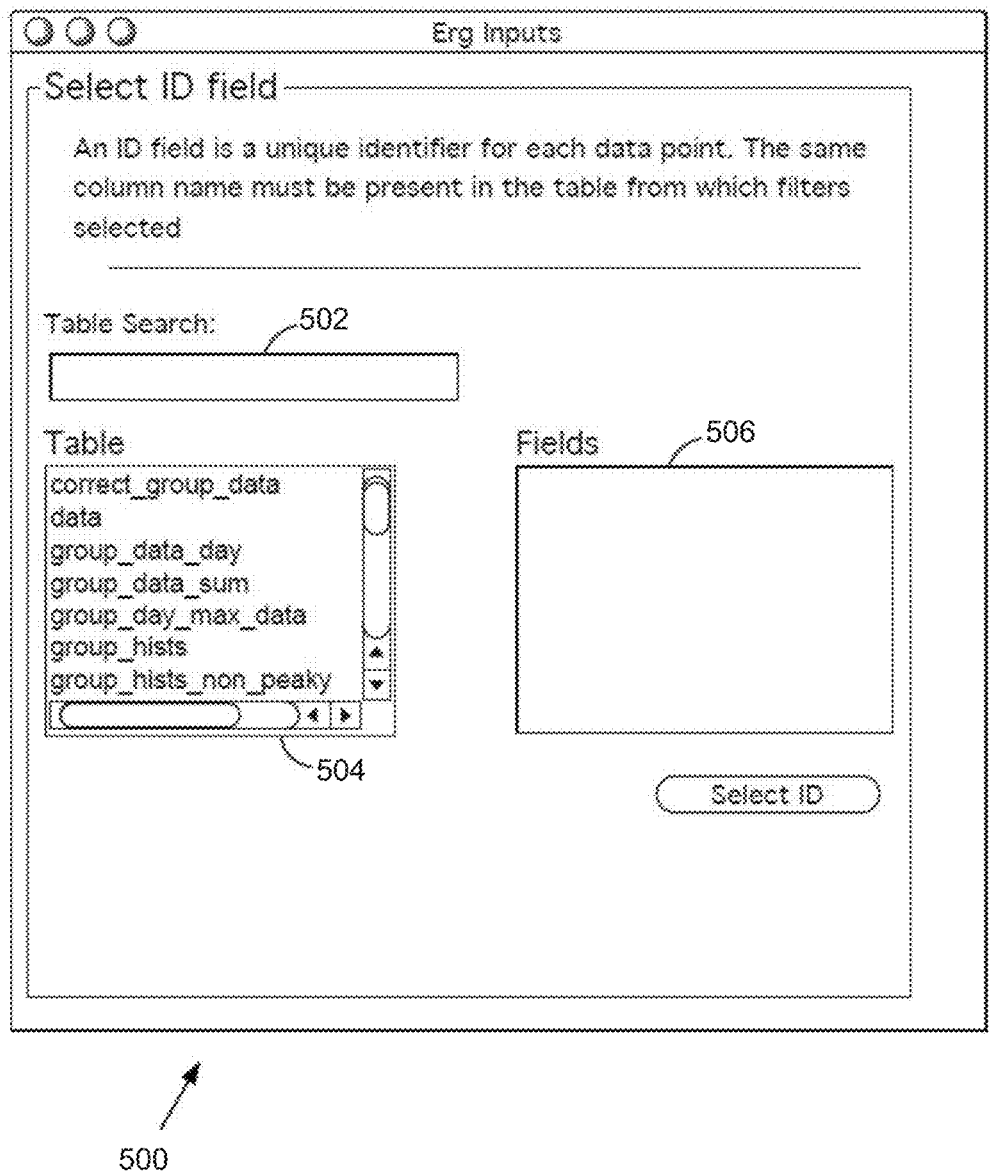
FIG. 5 is an example ID field selection interface window in some embodiments.
Figure 6A:
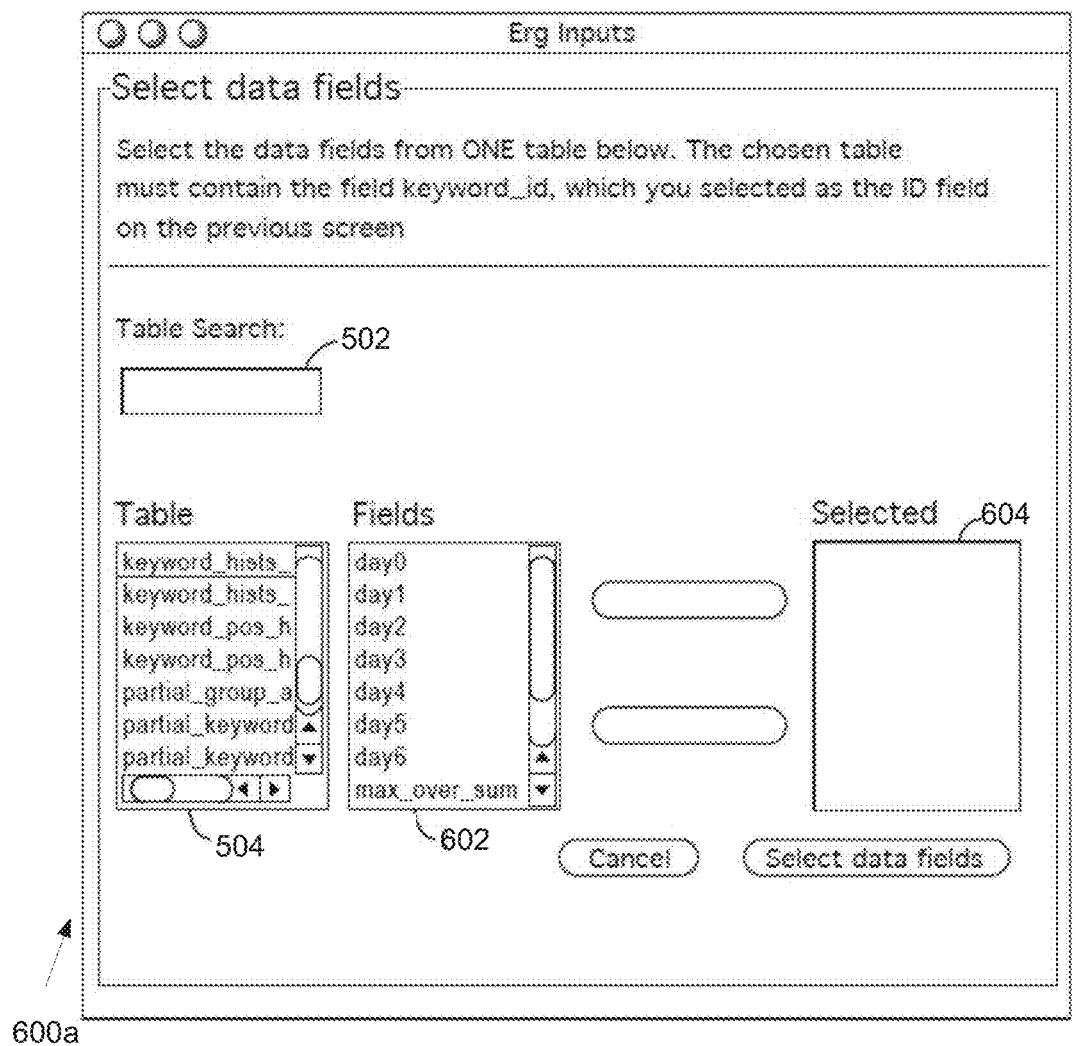
FIG. 6A is an example data field selection interface window in some embodiments.
Figure 6B:
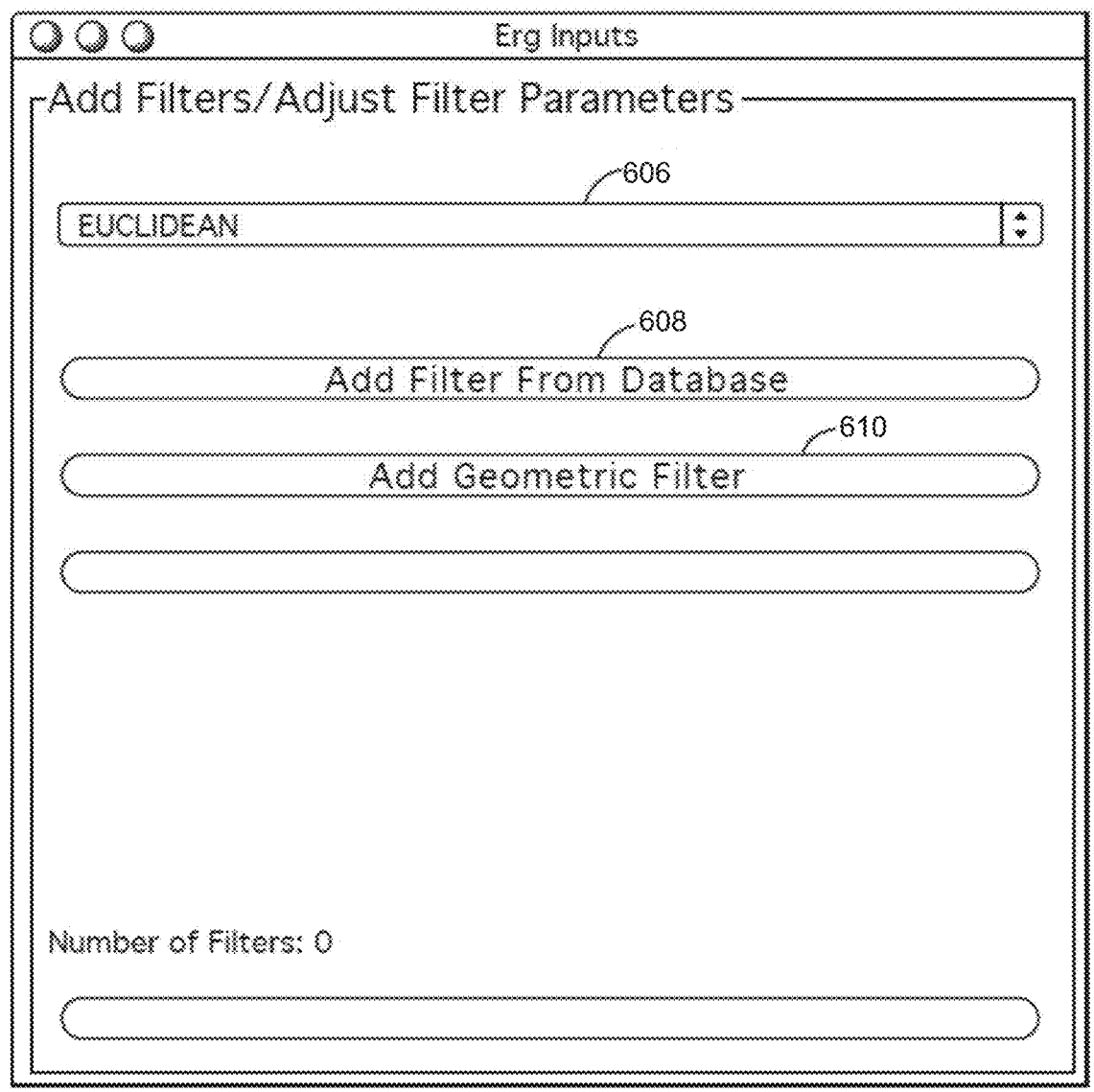
FIG. 6B is an example metric and filter selection interface window in some embodiments.
Figure 7:
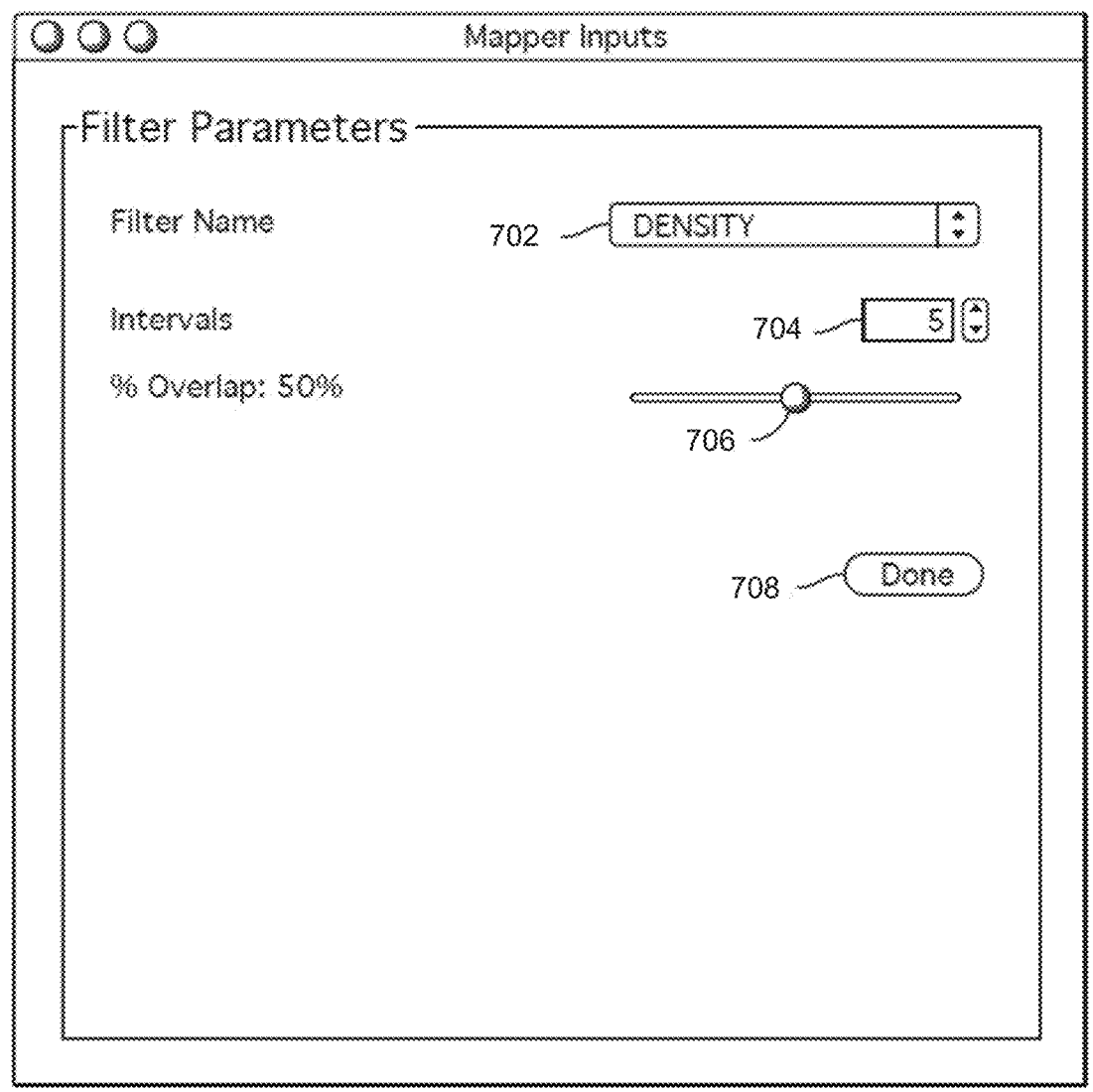
FIG. 7 is an example filter parameter interface window in some embodiments.

FIGS. 5-7 depict various interface windows to allow the user to make selections, enter information (e.g., fields, metrics, and filters), provide parameters (e.g., resolution), and provide data (e.g., identify the database) to be used with analysis. It will be appreciated that any graphical user interface or command line may be used to make selections, enter information, provide parameters, and provide data.

FIG. 5 is an example ID field selection interface window 500 in some embodiments. The ID field selection interface window 500 allows the user to identify an ID field. The ID field selection interface window 500 comprises a table search field 502, a table list 504, and a fields selection window 506.

In various embodiments, the input module 314 identifies and accesses a database from the database storage 324, user device 202a, or the data storage server 206. The input module 314 may then generate the ID field selection interface window 500 and provide a list of available tables of the selected database in the table list 504. The user may click on a table or search for a table by entering a search query (e.g., a keyword) in the table search field 502. Once a table is identified (e.g., clicked on by the user), the fields selection window 506 may provide a list of available fields in the selected table. The user may then choose a field from the fields selection window 506 to be the ID field. In some embodiments, any number of fields may be chosen to be the ID field(s).

FIG. 6A is an example data field selection interface window 600a in some embodiments. The data field selection interface window 600a allows the user to identify data fields. The data field selection interface window 600a comprises a table search field 502, a table list 504, a fields selection window 602, and a selected window 604.

In various embodiments, after selection of the ID field, the input module 314 provides a list of available tables of the selected database in the table list 504. The user may click on a table or search for a table by entering a search query (e.g., a keyword) in the table search field 502. Once a table is identified (e.g., clicked on by the user), the fields selection window 506 may provide a list of available fields in the selected table. The user may then choose any number of fields from the fields selection window 602 to be data fields. The selected data fields may appear in the selected window 604. The user may also deselect fields that appear in the selected window 604.

It will be appreciated that the table selected by the user in the table list 504 may be the same table selected with regard to FIG. 5. In some embodiments, however, the user may select a different table. Further, the user may, in various embodiments, select fields from a variety of different tables.

FIG. 6B is an example metric and filter selection interface window 600b in some embodiments. The metric and filter selection interface window 600b allows the user to identify a metric, add filter(s), and adjust filter parameters. The metric and filter selection interface window 600b comprises a metric pull down menu 606, an add filter from database button 608, and an add geometric filter button 610.

In various embodiments, the user may click on the metric pull down menu 606 to view a variety of metric options. Various metric options are described herein. In some embodiments, the user may define a metric. The user defined metric may then be used with the analysis.

In one example, finite metric space data may be constructed from a data repository (i.e., database, spreadsheet, or Matlab file). This may mean selecting a collection of fields whose entries will specify the metric using the standard Euclidean metric for these fields, when they are floating point or integer variables. Other notions of distance, such as graph distance between collections of points, may be supported.

The analysis module 320 may perform analysis using the metric as a part of a distance function. The distance function can be expressed by a formula, a distance matrix, or other routine which computes it. The user may add a filter from a database by clicking on the add filter from database button 608. The metric space may arise from a relational database, a Matlab file, an Excel spreadsheet, or other methods for storing and manipulating data. The metric and filter selection interface window 600b may allow the user to browse for other filters to use in the analysis. The analysis and metric function are further described in FIG. 8.

The user may also add a geometric filter 610 by clicking on the add geometric filter button 610. In various embodiments, the metric and filter selection interface window 600b may provide a list of geometric filters from which the user may choose.

FIG. 7 is an example filter parameter interface window 700 in some embodiments. The filter parameter interface window 700 allows the user to determine a resolution for one or more selected filters (e.g., filters selected in the metric and filter selection interface window 600). The filter parameter interface window 700 comprises a filter name menu 702, an interval field 704, an overlap bar 706, and a done button 708.

The filter parameter interface window 700 allows the user to select a filter from the filter name menu 702. In some embodiments, the filter name menu 702 is a drop down box indicating all filters selected by the user in the metric and filter selection interface window 600. Once a filter is chosen, the name of the filter may appear in the filter name menu 702. The user may then change the intervals and overlap for one, some, or all selected filters.

The interval field 704 allows the user to define a number of intervals for the filter identified in the filter name menu 702. The user may enter a number of intervals or scroll up or down to get to a desired number of intervals. Any number of intervals may be selected by the user. The function of the intervals is further discussed in FIG. 8.

The overlap bar 706 allows the user to define the degree of overlap of the intervals for the filter identified in the filter name menu 702. In one example, the overlap bar 706 includes a slider that allows the user to define the percentage overlap for the interval to be used with the identified filter. Any percentage overlap may be set by the user.

Once the intervals and overlap are defined for the desired filters, the user may click the done button. The user may then go back to the metric and filter selection interface window 600 and see a new option to run the analysis. In some embodiments, the option to run the analysis may be available in the filter parameter interface window 700. Once the analysis is complete, the result may appear in an interactive visualization which is further described in FIGS. 9-11.

It will be appreciated that that interface windows in FIGS. 4-7 are example. The example interface windows are not limited to the functional objects (e.g., buttons, pull down menus, scroll fields, and search fields) shown. Any number of different functional objects may be used. Further, as described herein, any other interface, command line, or graphical user interface may be used.

Figure 8:
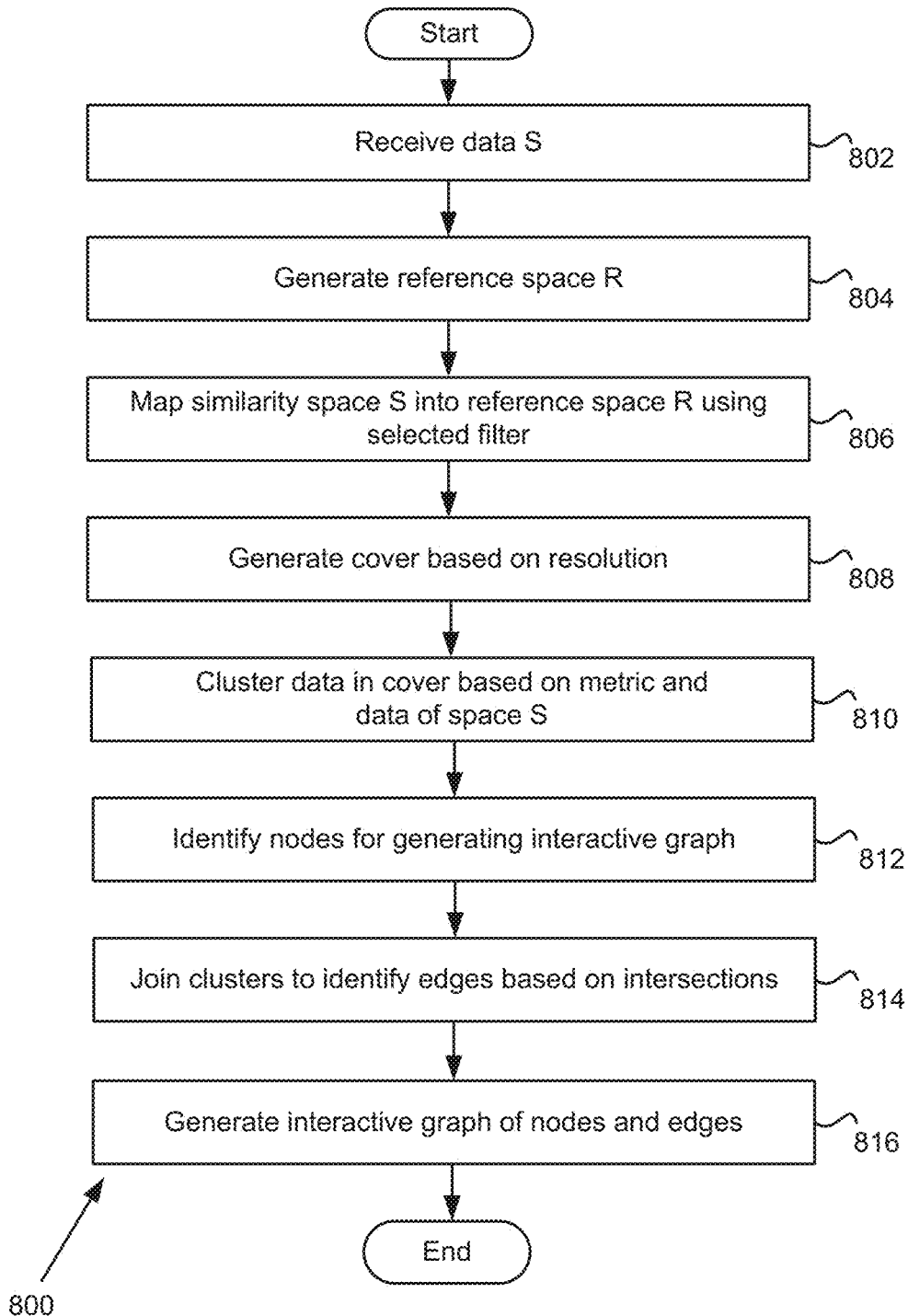
FIG. 8 is a flowchart for data analysis and generating a visualization in some embodiments.

FIG. 8 is a flowchart 800 for data analysis and generating an interactive visualization in some embodiments. In various embodiments, the processing on data and user-specified options is motivated by techniques from topology and, in some embodiments, algebraic topology. These techniques may be robust and general. In one example, these techniques apply to almost any kind of data for which some qualitative idea of "closeness" or "similarity" exists. The techniques discussed herein may be robust because the results may be relatively insensitive to noise in the data, user options, and even to errors in the specific details of the qualitative measure of similarity, which, in some embodiments, may be generally refer to as "the distance function" or "metric." It will be appreciated that while the description of the algorithms below may seem general, the implementation of techniques described herein may apply to any level of generality.

In step 802, the input module 314 receives data S. In one example, a user identifies a data structure and then identifies ID and data fields. Data S may be based on the information within the ID and data fields. In various embodiments, data S is treated as being processed as a finite "similarity space," where data S has a real-valued function d defined on pairs of points s and t in S, such that:

$$d(s,s)=0$$

$$d(s,t)=d(t,s)$$

$$d(s,t)>=0$$

These conditions may be similar to requirements for a finite metric space, but the conditions may be weaker.

In various examples, the function is a metric.

It will be appreciated that data S may be a finite metric space, or a generalization thereof, such as a graph or weighted graph. In some embodiments, data S be specified by a formula, an algorithm, or by a distance matrix which specifies explicitly every pairwise distance.

In step 804, the input module 314 generates reference space R. In one example, reference space R may be a well-known metric space (e.g., such as the real line). The reference space R may be defined by the user. In step 806, the analysis module 320 generates a map ref( ) from S into R. The map ref( ) from S into R may be called the "reference map."

In one example, a reference of map from S is to a reference metric space R. R may be Euclidean space of some dimension, but it may also be the circle, torus, a tree, or other metric space. The map can be described by one or more filters (i.e., real valued functions on S). These filters can be defined by geometric invariants, such as the output of a density estimator, a notion of data depth, or functions specified by the origin of S as arising from a data set.

In step 808, the resolution module 218 generates a cover of R based on the resolution received from the user (e.g., filter(s), intervals, and overlap—see FIG. 7). The cover of R may be a finite collection of open sets (in the metric of R) such that every point in R lies in at least one of these sets. In various examples, R is k-dimensional Euclidean space, where k is the number of filter functions. More precisely in this example, R is a box in k-dimensional Euclidean space given by the product of the intervals [min_k, max_k], where min_k is the minimum value of the k-th filter function on S, and max_k is the maximum value.

For example, suppose there are 2 filter functions, F1 and F2, and that F1's values range from −1 to +1, and F2's values range from 0 to 5. Then the reference space is the rectangle in the x/y plane with corners (−1,0), (1,0), (−1, 5), (1, 5), as every point s of S will give rise to a pair (F1(s), F2(s)) that lies within that rectangle.

In various embodiments, the cover of R is given by taking products of intervals of the covers of [min_k, max_k] for each of the k filters. In one example, if the user requests 2 intervals and a 50% overlap for F1, the cover of the interval [−1,+1] will be the two intervals (−1.5, 0.5), (−0.5, 1.5). If the user requests 5 intervals and a 30% overlap for F2, then that cover of [0, 5] will be (−0.3, 1.3), (0.7, 2.3), (1.7, 3.3), (2.7, 4.3), (3.7, 5.3). These intervals may give rise to a cover of the 2-dimensional box by taking all possible pairs of intervals where the first of the pair is chosen from the cover for F1 and the second from the cover for F2. This may give rise to 2*5, or 10, open boxes that covered the 2-dimensional reference space. However, it will be appreciated that the intervals may not be uniform, or that the covers of a k-dimensional box may not be constructed by products of intervals. In some embodiments, there are many other choices of intervals. Further, in various embodiments, a wide range of covers and/or more general reference spaces may be used.

In one example, given a cover, C1, . . . , Cm, of R, the reference map is used to assign a set of indices to each point in S, which are the indices of the Cj such that ref(s) belongs to Cj. This function may be called ref_tags(s). In a language such as Java, ref_tags would be a method that returned an int[ ]. Since the C's cover R in this example, ref(s) must lie in at least one of them, but the elements of the cover usually overlap one another, which means that points that "land near the edges" may well reside in multiple cover sets. In considering the two filter example, if F1(s) is −0.99, and F2(s) is 0.001, then ref(s) is (−0.99, 0.001), and this lies in the cover element (−1.5, 0.5)×(−0.3, 1.3). Supposing that was labeled C1, the reference map may assign s to the set {1}. On the other hand, if t is mapped by F1, F2 to (0.1, 2.1), then ref(t) will be in (−1.5, 0.5)×(0.7, 2.3), (−0.5, 1.5)×(0.7, 2.3), (−1.5, 0.5)×(1.7, 3.3), and (−0.5, 1.5)×(1.7, 3.3), so the set of indices would have four elements for t.

Having computed, for each point, which "cover tags" it is assigned to, for each cover element, Cd, the points may be constructed, whose tags include d, as set S(d). This may mean that every point s is in S(d) for some d, but some points may belong to more than one such set. In some embodiments, there is, however, no requirement that each S(d) is non-empty, and it is frequently the case that some of these sets are empty. In the non-parallelized version of some embodiments, each point x is processed in turn, and x is inserted into a hash-bucket for each j in ref_tags(t) (that is, this may be how S(d) sets are computed).

It will be appreciated that the cover of the reference space R may be controlled by the number of intervals and the overlap identified in the resolution (e.g., see FIG. 7). For example, the more intervals, the finer the resolution in S—that is, the fewer points in each S(d), but the more similar (with respect to the filters) these points may be. The greater the overlap, the more times that clusters in S(d) may intersect clusters in S(e)—this means that more "relationships" between points may appear, but, in some embodiments, the greater the overlap, the more likely that accidental relationships may appear.

In step 810, the analysis module 320 clusters each S(d) based on the metric, filter, and the space S. In some embodiments, a dynamic single-linkage clustering algorithm may be used to partition S(d). It will be appreciated that any number of clustering algorithms may be used with embodiments discussed herein. For example, the clustering scheme may be k-means clustering for some k, single linkage clustering, average linkage clustering, or any method specified by the user.

The significance of the user-specified inputs may now be seen. In some embodiments, a filter may amount to a "forced stretching" in a certain direction. In some embodiments, the analysis module 320 may not cluster two points unless ALL of the filter values are sufficiently "related" (recall that while normally related may mean "close," the cover may impose a much more general relationship on the filter values, such as relating two points s and t if ref(s) and ref(t) are sufficiently close to the same circle in the plane). In various embodiments, the ability of a user to impose one or more "critical measures" makes this technique more powerful than regular clustering, and the fact that these filters can be anything, is what makes it so general.

The output may be a simplicial complex, from which one can extract its 1-skeleton. The nodes of the complex may be partial clusters, (i.e., clusters constructed from subsets of S specified as the preimages of sets in the given covering of the reference space R).

In step 812, the graph engine 322 identifies nodes which are associated with a subset of the partition elements of all of the S(d) for generating an interactive visualization. For example, suppose that S={1, 2, 3, 4}, and the cover is C1, C2, C3. Then if ref_tags(1)={1, 2, 3} and ref_tags(2)={2, 3}, and ref_tags(3)={3}, and finally ref_tags(4)={1, 3}, then S(1) in this example is {1, 4}, S(2)={1,2}, and S(3)={1, 2, 3, 4}. If 1 and 2 are close enough to be clustered, and 3 and 4 are, but nothing else, then the clustering for S(1) may be {1} {3}, and for S(2) it may be {1,2}, and for S(3) it may be {1, 2}, {3, 4}. So the generated graph has, in this example, at most four nodes, given by the sets {1}, {4}, {1, 2}, and {3, 4} (note that {1, 2} appears in two different clusterings). Of the sets of points that are used, two nodes intersect provided that the associated node sets have a non-empty intersection (although this could easily be modified to allow users to require that the intersection is "large enough" either in absolute or relative terms).

Nodes may be eliminated for any number of reasons. For example, a node may be eliminated as having too few points and/or not being connected to anything else. In some embodiments, the criteria for the elimination of nodes (if any) may be under user control or have application-specific requirements imposed on it. For example, if the points are consumers, for instance, clusters with too few people in area codes served by a company could be eliminated. If a cluster was found with "enough" customers, however, this might indicate that expansion into area codes of the other consumers in the cluster could be warranted.

In step 814, the graph engine 322 joins clusters to identify edges (e.g., connecting lines between nodes). Once the nodes are constructed, the intersections (e.g., edges) may be computed "all at once," by computing, for each point, the set of node sets (not ref_tags, this time). That is, for each s in S, node_id_set(s) may be computed, which is an int[ ]. In some embodiments, if the cover is well behaved, then this operation is linear in the size of the set S, and we then iterate over each pair in node_id_set(s). There may be an edge between two node_id's if they both belong to the same node_id_set( ) value, and the number of points in the intersection is precisely the number of different node_id sets in which that pair is seen. This means that, except for the clustering step (which is often quadratic in the size of the sets S(d), but whose size may be controlled by the choice of cover), all of the other steps in the graph construction algorithm may be linear in the size of S, and may be computed quite efficiently.

Figure 10:
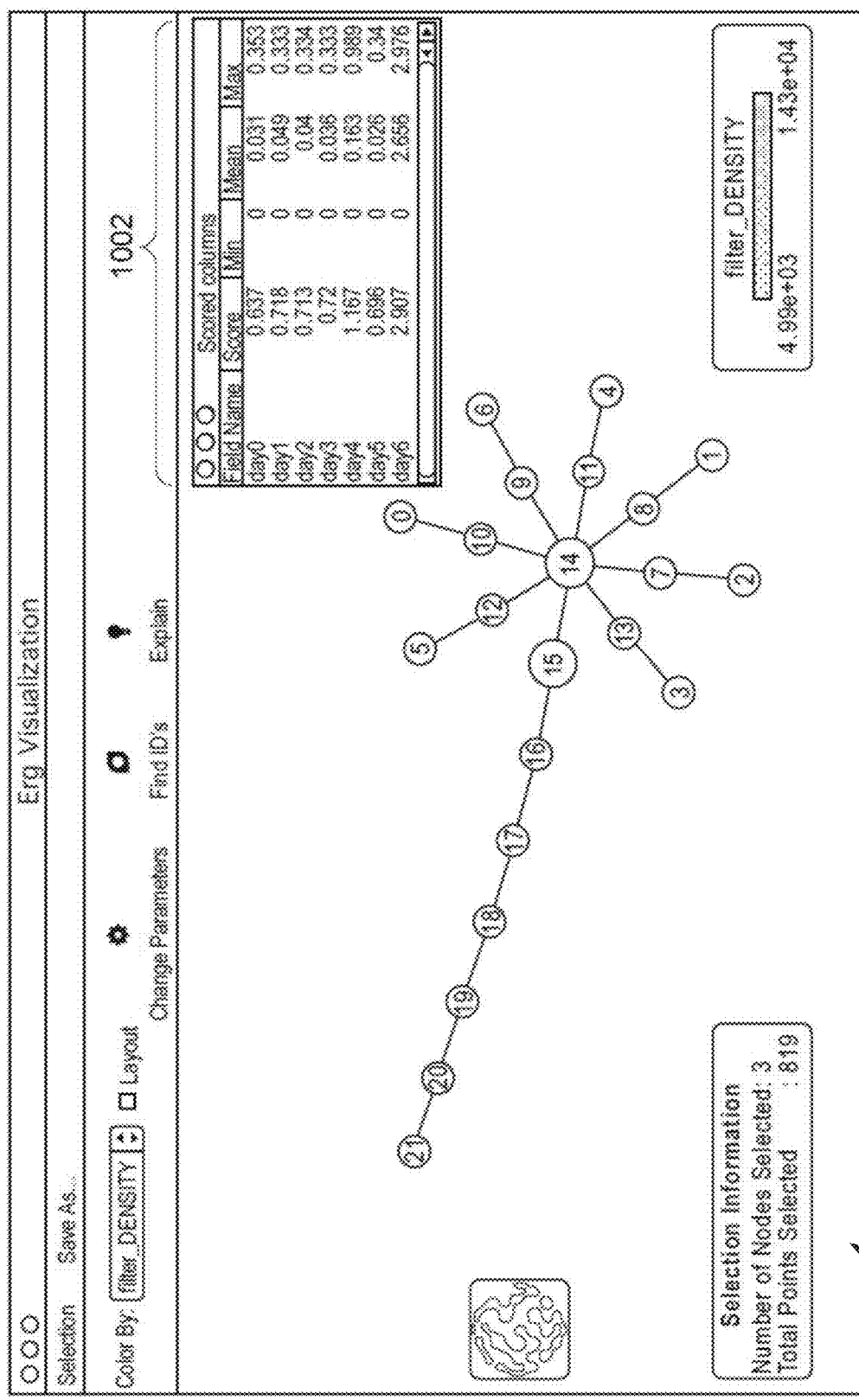
FIG. 10 is an example interactive visualization displaying an explain information window in some embodiments.
Figure 11:
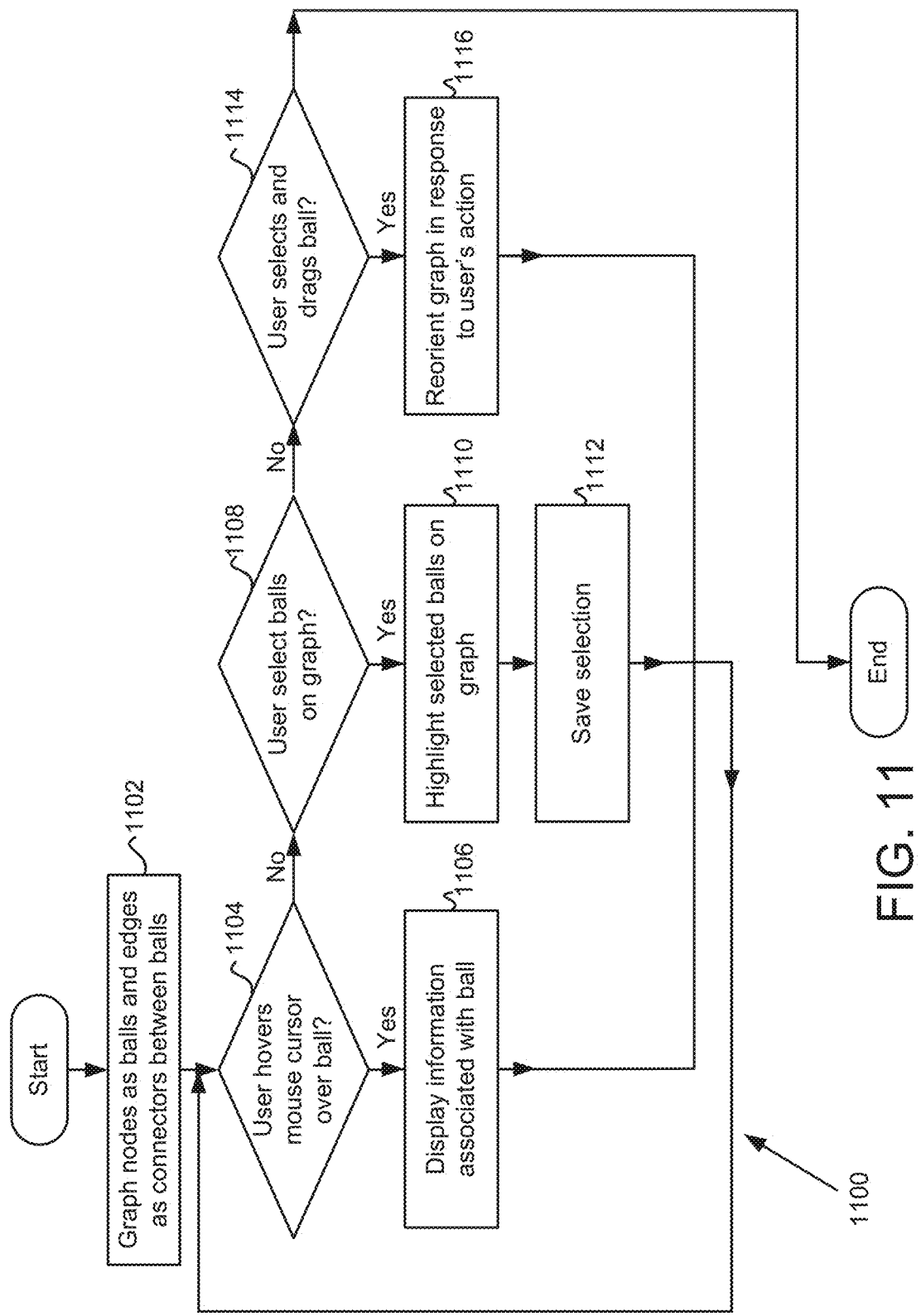
FIG. 11 is a flowchart of functionality of the interactive visualization in some

In step 816, the graph engine 322 generates the interactive visualization of interconnected nodes (e.g., nodes and edges displayed in FIGS. 10 and 11).

It will be appreciated that it is possible, in some embodiments, to make sense in a fairly deep way of connections between various ref( ) maps and/or choices of clustering. Further, in addition to computing edges (pairs of nodes), the embodiments described herein may be extended to compute triples of nodes, etc. For example, the analysis module 320 may compute simplicial complexes of any dimension (by a variety of rules) on nodes, and apply techniques from homology theory to the graphs to help users understand a structure in an automatic (or semi-automatic) way.

Further, it will be appreciated that uniform intervals in the covering may not always be a good choice. For example, if the points are exponentially distributed with respect to a given filter, uniform intervals can fail—in such case adaptive interval sizing may yield uniformly-sized S(d) sets, for instance.

Further, in various embodiments, an interface may be used to encode techniques for incorporating third-party extensions to data access and display techniques. Further, an interface may be used to for third-party extensions to underlying infrastructure to allow for new methods for generating coverings, and defining new reference spaces.

Figure 9:
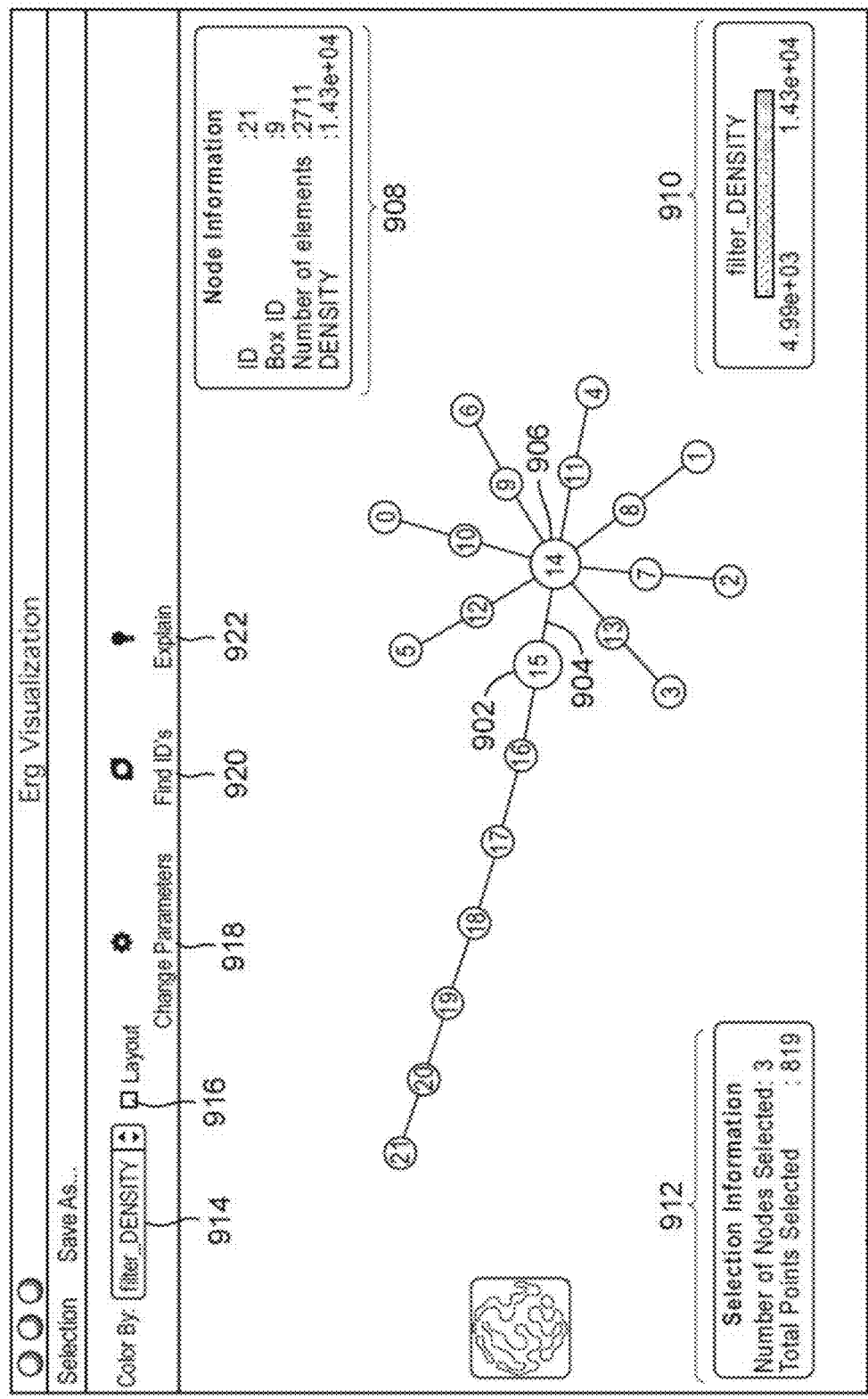
FIG. 9 is an example interactive visualization in some embodiments.

FIG. 9 is an example interactive visualization 900 in some embodiments. The display of the interactive visualization may be considered a "graph" in the mathematical sense. The interactive visualization comprises of two types of objects: nodes (e.g., nodes 902 and 906) (the colored balls) and the edges (e.g., edge 904) (the black lines). The edges connect pairs of nodes (e.g., edge 904 connects node 902 with node 906). As discussed herein, each node may represent a collection of data points (rows in the database identified by the user). In one example, connected nodes tend to include data points which are "similar to" (e.g., clustered with) each other. The collection of data points may be referred to as being "in the node." The interactive visualization may be two-dimensional, three-dimensional, or a combination of both.

In various embodiments, connected nodes and edges may form a graph or structure. There may be multiple graphs in the interactive visualization. In one example, the interactive visualization may display two or more unconnected structures of nodes and edges.

The visual properties of the nodes and edges (such as, but not limited to, color, stroke color, text, texture, shape, coordinates of the nodes on the screen) can encode any data based property of the data points within each node. For example, coloring of the nodes and/or the edges may indicate (but is not limited to) the following:
  Values of fields or filters
  Any general functions of the data in the nodes (e.g., if the data were unemployment rates by state, then GDP of the states may be identifiable by color the nodes)
  Number of data points in the node The interactive visualization 900 may contain a "color bar" 910 which may comprise a legend indicating the coloring of the nodes (e.g., balls) and may also identify what the colors indicate. For example, in FIG. 9, color bar 910 indicates that color is based on the density filter with blue (on the far left of the color bar 910) indicating "4.99e+03" and red (on the far right of the color bar 910) indicating "1.43e+04." In general this might be expanded to show any other legend by which nodes and/or edges are colored. It will be appreciated that the, In some embodiments, the user may control the color as well as what the color (and/or stroke color, text, texture, shape, coordinates of the nodes on the screen) indicates.

The user may also drag and drop objects of the interactive visualization 900. In various embodiments, the user may reorient structures of nodes and edges by dragging one or more nodes to another portion of the interactive visualization (e.g., a window). In one example, the user may select node 902, hold node 902, and drag the node across the window. The node 902 will follow the user's cursor, dragging the structure of edges and/or nodes either directly or indirectly connected to the node 902. In some embodiments, the interactive visualization 900 may depict multiple unconnected structures. Each structure may include nodes, however, none of the nodes of either structure are connected to each other. If the user selects and drags a node of the first structure, only the first structure will be reoriented with respect to the user action. The other structure will remain unchanged. The user may wish to reorient the structure in order to view nodes, select nodes, and/or better understand the relationships of the underlying data.

In one example, a user may drag a node to reorient the interactive visualization (e.g., reorient the structure of nodes and edges). While the user selects and/or drags the node, the nodes of the structure associated with the selected node may move apart from each other in order to provide greater visibility. Once the user lets go (e.g., deselects or drops the node that was dragged), the nodes of the structure may continue to move apart from each other.

In various embodiments, once the visualization module 322 generates the interactive display, the depicted structures may move by spreading out the nodes from each other. In one example, the nodes spread from each other slowly allowing the user to view nodes distinguish from each other as well as the edges. In some embodiments, the visualization module 322 optimizes the spread of the nodes for the user's view. In one example, the structure(s) stop moving once an optimal view has been reached.

It will be appreciated that the interactive visualization 900 may respond to gestures (e.g., multi-touch), stylus, or other interactions allowing the user to reorient nodes and edges and/or interacting with the underlying data.

The interactive visualization 900 may also respond to user actions such as when the user drags, clicks, or hovers a mouse cursor over a node. In some embodiments, when the user selects a node or edge, node information or edge information may be displayed. In one example, when a node is selected (e.g., clicked on by a user with a mouse or a mouse cursor hovers over the node), a node information box 908 may appear that indicates information regarding the selected node. In this example, the node information box 908 indicates an ID, box ID, number of elements (e.g., data points associated with the node), and density of the data associated with the node.

The user may also select multiple nodes and/or edges by clicking separate on each object, or drawing a shape (such as a box) around the desired objects. Once the objects are selected, a selection information box 912 may display some information regarding the selection. For example, selection information box 912 indicates the number of nodes selected and the total points (e.g., data points or elements) of the selected nodes.

The interactive visualization 900 may also allow a user to further interact with the display. Color option 914 allows the user to display different information based on color of the objects. Color option 914 in FIG. 9 is set to filter_Density, however, other filters may be chosen and the objects re-colored based on the selection. It will be appreciated that the objects may be colored based on any filter, property of data, or characterization. When a new option is chosen in the color option 914, the information and/or colors depicted in the color bar 910 may be updated to reflect the change.

Layout checkbox 914 may allow the user to anchor the interactive visualization 900. In one example, the layout checkbox 914 is checked indicating that the interactive visualization 900 is anchored. As a result, the user will not be able to select and drag the node and/or related structure. Although other functions may still be available, the layout checkbox 914 may help the user keep from accidentally moving and/or reorienting nodes, edges, and/or related structures. It will be appreciated that the layout checkbox 914 may indicate that the interactive visualization 900 is anchored when the layout checkbox 914 is unchecked and that when the layout checkbox 914 is checked the interactive visualization 900 is no longer anchored.

The change parameters button 918 may allow a user to change the parameters (e.g., add/remove filters and/or change the resolution of one or more filters). In one example, when the change parameters button 918 is activated, the user may be directed back to the metric and filter selection interface window 600 (see FIG. 6) which allows the user to add or remove filters (or change the metric). The user may then view the filter parameter interface 700 (see FIG. 7) and change parameters (e.g., intervals and overlap) for one or more filters. The analysis module 320 may then re-analyze the data based on the changes and display a new interactive visualization 900 without again having to specify the data sets, filters, etc.

The find ID's button 920 may allow a user to search for data within the interactive visualization 900. In one example, the user may click the find ID's button 920 and receive a window allowing the user to identify data or identify a range of data. Data may be identified by ID or searching for the data based on properties of data and/or metadata. If data is found and selected, the interactive visualization 900 may highlight the nodes associated with the selected data. For example, selecting a single row or collection of rows of a database or spreadsheet may produce a highlighting of nodes whose corresponding partial cluster contains any element of that selection.

In various embodiments, the user may select one or more objects and click on the explain button 922 to receive in-depth information regarding the selection. In some embodiments, when the user selects the explain button 922, the information about the data from which the selection is based may be displayed. The function of the explain button 922 is further discussed with regard to FIG. 10.

In various embodiments, the interactive visualization 900 may allow the user to specify and identify subsets of interest, such as output filtering, to remove clusters or connections which are too small or otherwise uninteresting. Further, the interactive visualization 900 may provide more general coloring and display techniques, including, for example, allowing a user to highlight nodes based on a user-specified predicate, and coloring the nodes based on the intensity of user-specified weighting functions.

The interactive visualization 900 may comprise any number of menu items. The "Selection" menu may allow the following functions:

Select singletons (select nodes which are not connected to other nodes)
Select all (selects all the nodes and edges)
Select all nodes (selects all nodes)
Select all edges
Clear selection (no selection)
Invert Selection (selects the complementary set of nodes or edges)
Select "small" nodes (allows the user to threshold nodes based on how many points they have)
Select leaves (selects all nodes which are connected to long "chains" in the graph)
Remove selected nodes
Show in a table (shows the selected nodes and their associated data in a table)
Save selected nodes (saves the selected data to whatever format the user chooses. This may allow the user to subset the data and create new data sources which may be used for further analysis.)

In one example of the "show in a table" option, information from a selection of nodes may be displayed. The information may be specific to the origin of the data. In various embodiments, elements of a database table may be listed, however, other methods specified by the user may also be included. For example, in the case of microarray data from gene expression data, heat maps may be used to view the results of the selections.

The interactive visualization 900 may comprise any number of menu items. The "Save" menu may allow may allow the user to save the whole output in a variety of different formats such as (but not limited to):

Image files (PNG/JPG/PDF/SVG etc.)
Binary output (The interactive output is saved in the binary format. The user may reopen this file at any time to get this interactive window again)

In some embodiments, graphs may be saved in a format such that the graphs may be used for presentations. This may include simply saving the image as a pdf or png file, but it may also mean saving an executable .xml file, which may permit other users to use the search and save capability to the database on the file without having to recreate the analysis.

In various embodiments, a relationship between a first and a second analysis output/interactive visualization for differing values of the interval length and overlap percentage may be displayed. The formal relationship between the first and second analysis output/interactive visualization may be that when one cover refines the next, there is a map of simplicial complexes from the output of the first to the output of the second. This can be displayed by applying a restricted form of a three-dimensional graph embedding algorithm, in which a graph is the union of the graphs for the various parameter values and in which the connections are the connections in the individual graphs as well as connections from one node to its image in the following graph. The constituent graphs may be placed in its own plane in 3D space. In some embodiments, there is a restriction that each constituent graph remain within its associated plane. Each constituent graph may be displayed individually, but a small change of parameter value may result in the visualization of the adjacent constituent graph. In some embodiments, nodes in the initial graph will move to nodes in the next graph, in a readily visualizable way.

FIG. 10 is an example interactive visualization 1000 displaying an explain information window 1002 in some embodiments. In various embodiments, the user may select a plurality of nodes and click on the explain button. When the explain button is clicked, the explain information window 1002 may be generated. The explain information window 1002 may identify the data associated with the selected object(s) as well as information (e.g., statistical information) associated with the data.

In some embodiments, the explain button allows the user to get a sense for which fields within the selected data fields are responsible for "similarity" of data in the selected nodes and the differentiating characteristics. There can be many ways of scoring the data fields. The explain information window 1002 (i.e., the scoring window in FIG. 10) is shown along with the selected nodes. The highest scoring fields may distinguish variables with respect to the rest of the data.

In one example, the explain information window 1002 indicates that data from fields day0-day6 has been selected. The minimum value of the data in all of the fields is 0. The explain information window 1002 also indicates the maximum values. For example, the maximum value of all of the data associated with the day0 field across all of the points of the selected nodes is 0.353. The average (i.e., mean) of all of the data associated with the day0 field across all of the points of the selected nodes is 0.031. The score may be a relative (e.g., normalized) value indicating the relative function of the filter; here, the score may indicate the relative density of the data associated with the day0 field across all of the points of the selected nodes. It will be appreciated that any information regarding the data and/or selected nodes may appear in the explain information window 1002.

It will be appreciated that the data and the interactive visualization 1000 may be interacted with in any number of ways. The user may interact with the data directly to see where the graph corresponds to the data, make changes to the analysis and view the changes in the graph, modify the graph and view changes to the data, or perform any kind of interaction.

FIG. 11 is a flowchart 1100 of functionality of the interactive visualization in some embodiments. In step 1102, the graph engine 322 receives the analysis from the analysis module 320 and graphs nodes as balls and edges as connectors between balls 1202 to create interactive visualization 900 (see FIG. 9).

In step 1104, the graph engine 322 determines if the user is hovering a mouse cursor (or has selected) a ball (i.e., a node). If the user is hovering a mouse cursor over a ball or selecting a ball, then information is displayed regarding the data associated with the ball in step 1106. In one example, the graph engine 322 displays a node information window 908.

If the graph engine 322 does not determine that the user is hovering a mouse cursor (or has selected) a ball, then the graph engine 322 determines if the user has selected balls on the graph (e.g., by clicking on a plurality of balls or drawing a box around a plurality of balls) in step 1108. If the user has selected balls on the graph, the graph engine 322 may highlight the selected balls on the graph in step 1110. The graph engine 322 may also display information regarding the selection (e.g., by displaying a selection information window 912). The user may also click on the explain button 922 to receive more information associated with the selection (e.g., the graph engine 322 may display the explain information window 1002).

In step 1112, the user may save the selection. For example, the graph engine 322 may save the underlying data, selected metric, filters, and/or resolution. The user may then access the saved information and create a new structure in another interactive visualization 900 thereby allowing the user to focus attention on a subset of the data.

If the graph engine 322 does not determine that the user has selected balls on the graph, the graph engine 322 may determine if the user selects and drags a ball on the graph in step 1114. If the user selects and drags a ball on the graph, the graph engine 322 may reorient the selected balls and any connected edges and balls based on the user's action in step 1116. The user may reorient all or part of the structure at any level of granularity.

It will be appreciated that although FIG. 11 discussed the user hovering over, selecting, and/or dragging a ball, the user may interact with any object in the interactive visualization 900 (e.g., the user may hover over, select, and/or drag an edge). The user may also zoom in or zoom out using the interactive visualization 900 to focus on all or a part of the structure (e.g., one or more balls and/or edges).

Further, although balls are discussed and depicted in FIGS. 9-11, it will be appreciated that the nodes may be any shape and appear as any kind of object. Further, although some embodiments described herein discuss an interactive visualization being generated based on the output of algebraic topology, the interactive visualization may be generated based on any kind of analysis and is not limited.

When data is time dependent, it is valuable to understand how groups of data points change over time. Over time, groups may form, break apart, create new groups, or simply break down. This information may be used, for example, for customer segmentation. For example, bank customers may be grouped based on income, investment choices, children of college age, real estate investment, ownership of annuities, debt load, or any combination of these. It may be valuable for the bank to track customers based on these customer groups. Using this information, the bank may offer or plan to offer financial products or incentives based on the size and/or needs of one or more of these groups (e.g., in view of the economy and changing consumer preferences) that exist to today or expect to exist tomorrow. As customers grow older, their finances and financial needs change. Although banks can estimate expected behavior of their customer groups as their existing customers age, customers groups may be unexpectedly impacted by any number of factors including, for example, trends in the market, regulation, economy, and/or banking competitors. As a result of many anticipated and unanticipated factors, the customer groups may change, grow, diminish, or cease to be relevant.

In some embodiments, systems and methods are described herein that may track behavior of clusters and more general subgroups in a data set which is time dependent. There are many methods for clustering data (i.e. for partitioning the set into a moderate number of clusters) for which the members of each cluster are characterized by some understandable variables. In some embodiments, systems and methods described herein produce a visual representation which encodes different group transitions. A network, either visualized or not visualized, may be constructed whose nodes are clusters computed over the subsets of points with time stamps that are within fixed intervals within a time domain, and where connections are described in a systematic way.

Figure 12:
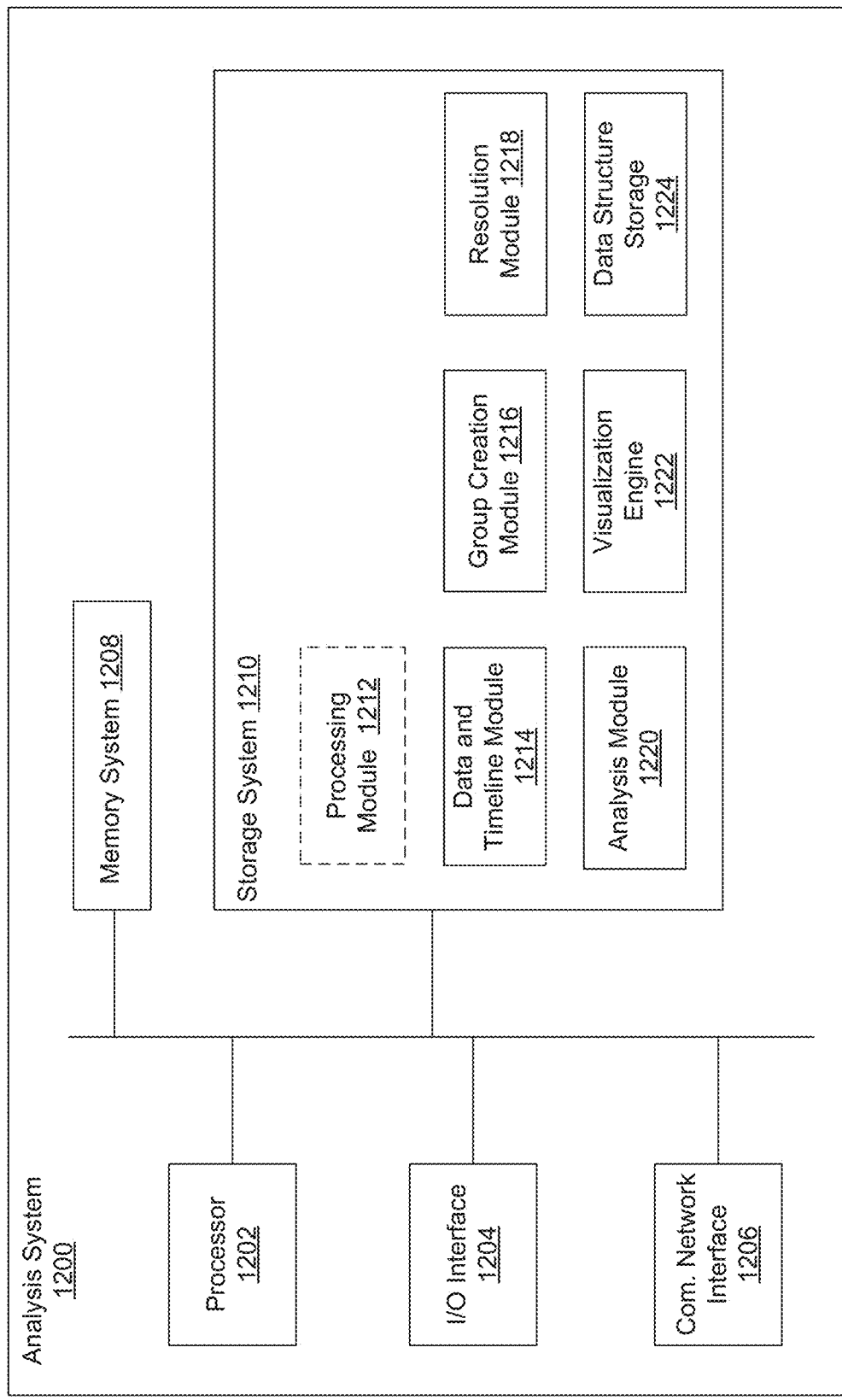
FIG. 12 depicts an example analysis system in some embodiments.

FIG. 12 depicts an example analysis system 1200 in some embodiments. The analysis system 1200 may be a part of the analysis server 208. In example embodiments, the analysis system 1200 may comprise a processor 1202, an input/output (I/O) interface 1204, a communication network interface 1206, a memory system 1208, and a storage system 1210. The processor 1202, similar to the processor 302 discussed with regard to FIG. 3, may comprise any processor or combination of processors with one or more cores.

The I/O interface 1204, similar to the I/O interface 304 discussed with regard to FIG. 3, may comprise interfaces for various I/O devices such as, for example, a keyboard, mouse, and display device. The communication network interface 1206, similar to the communication network interface 306 discussed with regard to FIG. 3, may be any kind of interface to communicate with any kind of wired and/or wireless network such as the communication network 204.

The memory system 1208, similar to the memory system 308 discussed with regard to FIG. 3, may be any kind of memory including RAM, ROM, or flash, cache, virtual memory, or the like.

The storage system 1210, similar to the storage system 310 discussed with regard to FIG. 3, includes any storage configured to retrieve and store data. The storage system 1210 may comprise a plurality of modules utilized by embodiments of discussed herein. As discussed herein, a module and/or engine may include any processor or combination of processors. In some examples, a module and/or engine may include or be a part of a processor, digital signal processor (DSP), application specific integrated circuit (ASIC), an integrated circuit, and/or the like. In various embodiments, the modules and/or engine may be software or firmware.

The storage system 1210 may comprise an optional processing module 1212. The optional processing module 1212, similar to the processing module 312 discussed with regard to FIG. 3, may perform topological data analysis. In some embodiments, the optional processing module 1212 generates visualizations to depict the shape of data from the topological data analysis or generates graphs that are not visualized. The optional processing module 1212 and optional components are discussed herein.

The storage system 1210 may comprise a data and timeline module 1214, a group creation module 1216, a resolution module 1218, an analysis module 1220, a visualization engine 1222, and a data structure storage 1224. It will be appreciated that the data and timeline module 1214, the group creation module 1216, the resolution module 1218, the analysis module 1220, and the visualization engine 1222 may comprise more, less, or functionally equivalent components and modules.

Generally, one or more modules and/or engines of the storage system 1210 may receive data and time information, create a set of overlapping intervals, construct a subset of data points for each overlapping interval, apply one or more distance functions to each subset of data to identify groups, and construct nodes for each group of data points. The modules and/or engines may further determine if there are edges between groups of adjacent time periods and construct edges accordingly. Optionally, a network of nodes and edges may be displayed. Alternately, reports or other information may be displayed based on the nodes and/or edges.

The data and timeline module 1214 may be configured to receive data from any number of sources. The data, in one example, may be a finite set (e.g., finite set A). There may be a value $t_a$ indicating a time (e.g., a time stamp) for any number of data points in A. In some embodiments, there is a time stamp for each data point in A. A distance function may be performed on one or more data points in the data.

In various embodiments, the data and timeline module 1214 may organize the received data. For example, data can be organized (e.g., normalized and/or structured) based on any feature or combination of features. In the bank customer example herein, the bank may wish to track customers based on income and real estate ownership. The data may include much more information, but the data and timeline module 1214 may organize, filter, and/or identify the relevant information within the data for further assessment. In some embodiments, the data and timeline module 1214 may structure and/or normalize all or part of the data.

The following are examples of data that may be received by the analysis system 1200. In one example, the data and timeline module 1214 may receive market condition data in a spreadsheet format including a time field. The other fields might be, for example, various macroeconomic variables measured at the time stamp. In this case, a higher dimensional version of Euclidean distance may be applied to all the macroeconomic fields (but not including the time stamp). In another example, normalized versions of the macroeconomic variables may be used, where one mean centers each variable and scales them to produce the same variance across the fields.

In another example, the data and timeline module 1214 may receive social media data whereby data sets contain posts on social media (e.g., posts from a social media website or smartphone application). Such posts typically come with a time stamp, and consist of (usually) short documents of unstructured text. In various embodiments, the storage system 1210 may comprise a language processing module (not depicted). The language processing module may perform natural language processing on the unstructured text of the short documents to create vectors associated to the documents. The group creation module 1216 (described herein) may utilize these vectors to define a distance function, using Euclidean distances or variants of it, such as correlation distance, cosine distance, or the normalized version of Euclidean distance in the previous example.

In a further example, the data and timeline module 1214 may receive cyber security data that comprises log files as well as event logs, transaction logs, or other events. The data may be equipped with a time stamp. In this case, the group creation module 1216 may specify a distance function based on the specific use case and/or using Euclidean distances or variants of it, such as correlation distance, cosine distance, or the normalized version of Euclidean distance in the previous example. In some embodiments, the data and timeline module 1214 may receive one or more distance functions to utilize to assist in group creation.

In some embodiments, the data and timeline module 1214 may receive maintenance data of industrial systems. In this example, the data is again numeric, with the fields containing various measurements taken from various systems, such as an electric grid. The measurements are again typically equipped with a time stamp, but the distance function may be computed without using the time stamp. In some examples, the group creation module 1216 may utilize a distance function of one of the variants of Euclidean distance described herein.

The group creation module 1216 is configured to use one or more distance functions to create a family of disjoint subsets of the data received by the data and timeline module 1214. It will be appreciated that the group creation module 1216 may receive one or more selections of distance functions. For example, the group creation module 1216 may provide a list of distance function identifiers to a data scientist or other user. The group creation module 1216 may receive one or more distance functions to utilize with the data from the data and timeline module 1214. One or more distance functions may be provided to the group creation module 1216 in any number of ways. In some embodiments, the group creation module 1216 may scan all or part of the data to determine one or more distance functions of a set of distance functions to utilize. In this example, the group creation module 1216 may scan the data for one or more elements associated with one or more distance functions one or more distance functions of a set of distance functions.

The resolution module 1218 is configured to receive or select a resolution to be utilized by the group creation module 1216 to create the overlapping intervals. In some embodiments, the resolution module 1218 may receive or select a time period range ($t_0$-$t_1$), a number of overlapping intervals (N), and a resolution (R). The resolution module 1218 may provide the time period range ($t_0$-$t_1$), the number of overlapping intervals (N), and the resolution (R) to the group creation module 1216.

The resolution module 1218 may receive the time period range $t_0$-$t_1$, interval number N (e.g., an integer), and/or the resolution number R (e.g., a positive real number) in any number of ways. In some embodiments, the resolution module 1218 may receive the desired time period range $t_0$-$t_1$, the overlapping interval number N, and the resolution number R from a data scientist or user. For example, the analysis system 1200 may provide an interface requesting the desired time period range $t_0$-$t_1$, interval number N, and/or the resolution number R from a user or data scientist or other user. In various embodiments, the resolution module 1218 may receive the desired time period range $t_0$-$t_1$, interval number N, and/or the resolution number R in the data (e.g., the data received by the data and timeline module 1214). Alternately, the resolution module 1218 may determine the time period range $t_0$-$t_1$, the interval number N and/or the resolution number R based on the data.

In some embodiments, the resolution module 1218 may determine the time period range $t_0$-$t_1$ based on the time stamps associated with or within the data. For example, the resolution module 1218 may determine an earliest time from the data and a latest time of the data and identify the time period range $t_0$-$t_1$ based on the difference. It will be appreciated that the resolution module 1218 may receive an indication of a subset of the received data (e.g., the subset being data of interest while the rest of the data may be filtered or removed) and the resolution module 1218 may determine an earliest time from the subset of data and a latest time of the subset of data to identify the time period range $t_0$-$t_1$ based on the difference.

The resolution module 1218 may also determine a number of overlapping intervals. In some embodiments, the resolution module 1218 may identify the number of intervals N based on the duration of time and desired resolution. The desired resolution may be received from a data scientist of user (e.g., via an interface).

In some embodiments, the resolution R may be selected, determined, or received such that $$R < \frac{t_1 - t_0}{2N}$$

(e.g., that is R is less than the time interval divided by two times the interval number N). In various embodiments, the resolution module 1218 may determine the resolution based on time stamps in the data and/or the time period range $t_0$-$t_1$. For example, the resolution module 1218 may determine that the time period range $t_0$-$t_1$ indicates a duration of ten years and may divide durations of one year or greater into a predetermined number of overlapping intervals. In some embodiments, the resolution module 1218 may associate different time period ranges with different numbers of overlapping intervals.

In various embodiments, the group creation module 1216 utilizes one or more of the time interval $t_0$-$t_1$, the overlapping interval number N, and/or the resolution number R to group the data and identify nodes that may change over time. Examples are further discussed regarding FIG. 13 and herein.

For each k, the group creation module 1216 constructs the subset $A_k \subseteq A$ as the set of those elements of A for which the time stamp $t_a$ is in the interval $I_k$. The group creation module 1216 may define $B_k$ for $0 \leq k \leq N-2$ to be the subset of points a for which $t_a$ is in the interval $I_k \cap I_{k+1}$. The group creation module 1216 may apply the group creation method to all of the sets $A_k$ and $B_k$ separately. In various embodiments, the group creation module 1216 may apply one or more distance functions to each subset of data in an interval to identify groups.

In various embodiments, the group creation module 1216 constructs a node for each group. Note that the groups constructed for $A_k$ may intersect the nodes created for $B_{k-1}$ and $B_k$. There may be no intersections for any other pairs of groups.

The analysis module 1218 may be configured to determine if there is an edge (e.g., a connection) between adjacent nodes over time. Two nodes are adjacent if they are closest in time when compared to other nodes. For example, in time interval Time 1, there may be Node "A". During the transition (e.g., an intersection between time intervals) to the next interval Time 2, there may be another node (e.g., Node "B") that shares some data points with Node "A". A line or edge may connect Node "A" with Node "B" in some circumstances indicate that at least some data points in Node "A" transitioned to Node "B". In another example, in time interval Time 1, there may be Node "A". If there are no tracked transitions, the next interval may be Time 2 where there may be another node (e.g., Node "B") that shares some data points with Node "A". A line or edge may connect Node "A" with Node "B" in some circumstances indicating that at least some data points in Node "A" transitioned to Node "B".

The analysis module 1218 may determine an edge or line between nodes in any number of ways. In various embodiments, the analysis module 1218 scores each pair of groups and compares the score to a threshold to determine an edge or line between nodes associated with the groups. In one example, for each pair of groups $G \subseteq A_k$ and $H \subseteq B_{k-1}$ or $B_k$, the analysis module 1218 computes a score such as a Jaccard score using the ratio:

$$J(G, H) = \frac{\#(G \cap H)}{\#(G \cup H)}$$

The analysis module 1218 may compare J(G, H) to a threshold (e.g., Jaccard threshold $J_0$) to determine an edge between nodes. The analysis module 1218 may, for example, create an edge between any two nodes whose corresponding groups have a Jaccard score greater or equal to the threshold $J_0$. It will be appreciated that the analysis module 1218 may create an edge based on a comparison of any pair of groups to any kind of threshold. In some embodiments, the analysis module 1218 may create an edge if a score of groups is less than a threshold, equal to a threshold, not equal to a threshold, less than or equal to a threshold, greater than a threshold, or the like.

It will also be appreciated that the threshold may be a value or any function. In some embodiments, the analysis module 1218 may receive the threshold from a user or data scientist (e.g., via an interface or within the data) or may compute the threshold from the data. In some embodiments, the analysis module 1218 may identify a type of data received by the data and timeline module 1214 and may select a threshold from a plurality of thresholds based on the data type (e.g., financial data type data, social media type data, computer log type data, or the like). The analysis module 1218 may, in some embodiments, calculate the threshold by modelling shared membership between groups to find patterns of relationships and connecting groups with an edge when a sufficient connection of data points between the groups is identified relative to other groups.

Figure 14:
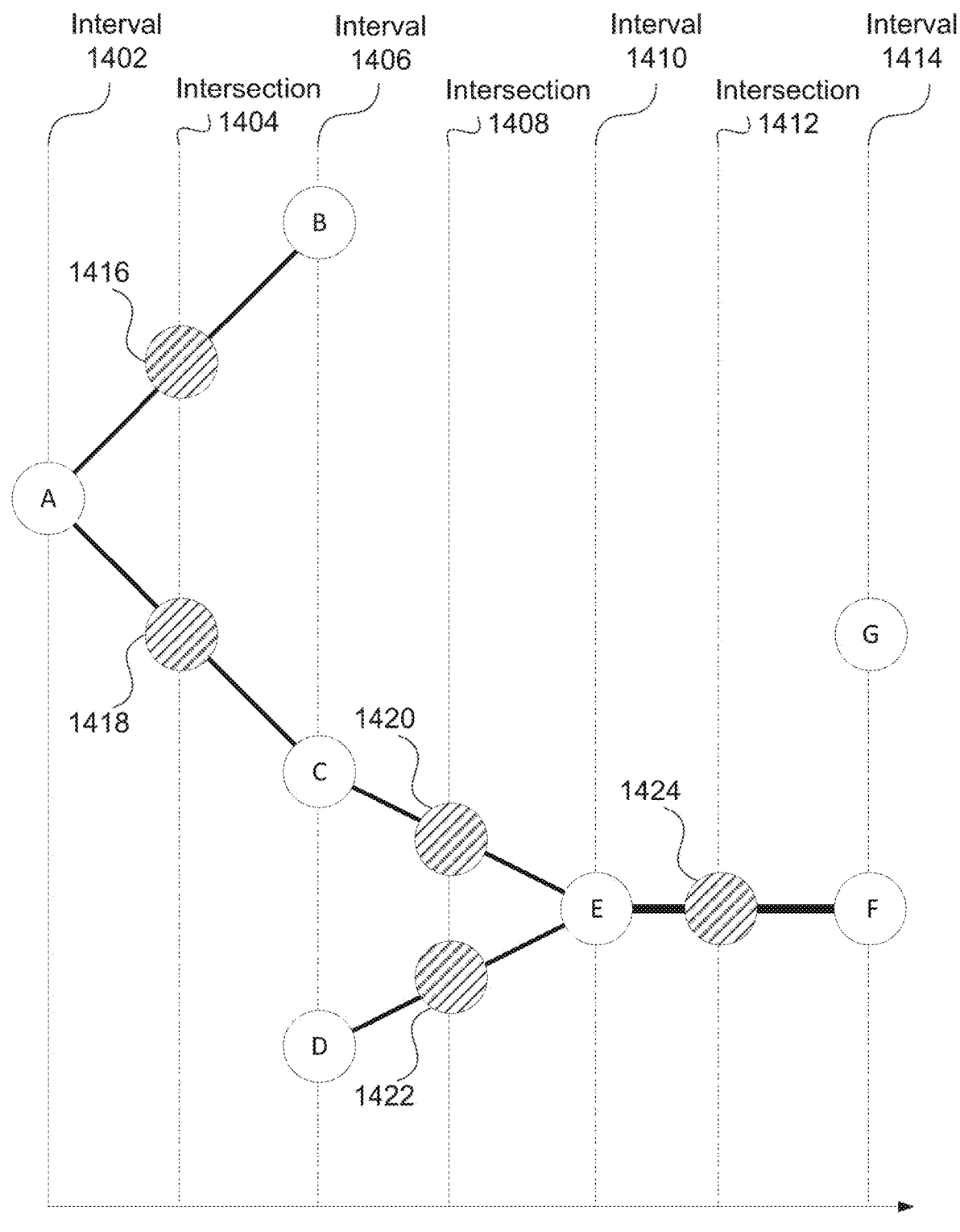
FIG. 14 depicts a visualization in some embodiments.

The visualization engine 1222 may be configured to generate a visualization of the nodes and edges (e.g., over time) such as the visualization depicted in FIG. 14. The visualization engine 1222 may display the visualization in any number of ways including, for example, using a force-directed layout to stretch out the nodes and edges of the network for easier visualization. In some embodiments, the visualization engine 1222 displays the nodes and edges of the network over a timeline.

In some embodiments, the visualization engine 1222 may provide or display reports or information based on the groups over time or connected group. For example, the visualization engine 1222 may provide or display information regarding data points from the received data that is a member of a group that changed, disappeared, lasted the longest over the timeline, the largest group, merged with another group, or the like.

The data structure storage 1224 may be any long term storage. The data structure storage 1224 may store data received by the data and timeline module 1214, groups created by the group creation module 1216, analysis information (e.g., scores and thresholds) from the analysis module 1220, and/or visualizations and reports from the visualization engine 1222. The data structure storage 1224 may store any data in any kind of data structure(s) (e.g., tables, databases, lists, or the like).

The processing module 1212, may be similar to the processing module 312 as discussed in FIG. 3. The optional processing module may include an input module, a filter module, a resolution module, an analysis module, a graph engine, and a database storage. The input module, filter module, resolution module, analysis module, and graph engine may be utilized, in some embodiments, to perform TDA on financial data (e.g., intermarket and/or macroeconomic data).

Like the input module 314 of FIG. 3, the input module of the processing module 1212 may be configured to receive commands and preferences from a user device (e.g., user device 202*a*). In some embodiments, the input module of the processing module 1212 may work with or replace the data and timeline module 1214. In various examples, the input module of the processing module 1212 receives selections from the user which will be used to perform analysis. The output of the analysis may be an interactive visualization from a graph engine or a report from a report module (e.g., a graphic, table, text, or any combination).

In some embodiments, the input module of the processing module 1212 may provide the user a variety of interface windows allowing the user to select and access a database, choose fields associated with the database, choose a metric, choose one or more filters, and identify resolution parameters for the analysis.

The filter module of the processing module 1212 may provide the user with an interface window to allow the user to select a metric to be used in analysis of the data within the chosen data fields. The filter module of the processing module 1212 may also allow the user to select and/or define one or more filters.

The resolution module of the processing module 1212 may allow the user to select a resolution and gain, including filter parameters. In one example, the user enters a number of intervals and a percentage overlap for a filter.

The analysis module of the processing module 1212 may perform data analysis based on the database and the information provided by the user. In various embodiments, the analysis module of the processing module 1212 performs an algebraic topological analysis to identify structures and relationships within data and clusters of data. It will be appreciated that the analysis module of the processing module 1212 may use parallel algorithms or use generalizations of various statistical techniques (e.g., generalizing the bootstrap to zig-zag methods) to increase the size of data sets that can be processed. The analysis is further discussed in FIG. 8. It will be appreciated that the analysis module of the processing module 1212 is not limited to algebraic topological analysis but may perform any analysis.

The graph engine of the processing module 1212 may generate a non-visualized graph, a non-interactive visualization, an interactive visualization, or any combination using the output from the analysis module of the processing module 1212. The non-interactive visualization and interactive visualization allow the user to see all or part of the analysis graphically. The interactive visualization also allows the user to interact with the visualization. For example, the user may select portions of a graph from within the visualization to see and/or interact with the underlying data and/or underlying analysis. The user may then change the parameters of the analysis (e.g., change the metric, filter(s), or resolution(s)) which allows the user to visually identify relationships in the data that may be otherwise undetectable using prior means. The interactive visualization is further described in FIGS. 9-11. In some embodiments, the engine of the processing module 1212 may work with or replace the visualization engine 1222.

The database storage of the processing module 1212 is configured to store all or part of the database that is being accessed. In some embodiments, the database storage of the processing module 1212 may store saved portions of the database. Further, the database storage of the processing module 1212 may be used to store user preferences, parameters, and analysis output thereby allowing the user to perform many different functions on the database without losing previous work. In some embodiments, the database storage of the processing module 1212 may work with or replace data structure storage 1224.

It will be appreciated that that all or part of the analysis system 1200 may be at the user device 202*a*, the database storage server 206, another digital device, or any combination. The placement engine 1214, distance module 1216, graph update engine 1218, prediction module 1220, and report module 1222 are further discussed relative to FIGS. 17-29.

In various embodiments, systems and methods discussed herein may be implemented with one or more digital devices. In some examples, some embodiments discussed herein may be implemented by a computer program (instructions) executed by a processor. The computer program may provide a graphical user interface. Although such a computer program is discussed, it will be appreciated that embodiments may be performed using any of the following, either alone or in combination, including, but not limited to, a computer program, multiple computer programs, firmware, and/or hardware.

A module and/or engine may include any processor or combination of processors. In some examples, a module and/or engine may include or be a part of a processor, digital signal processor (DSP), application specific integrated circuit (ASIC), an integrated circuit, and/or the like. In various embodiments, the module and/or engine may be software or firmware.

Figure 13:
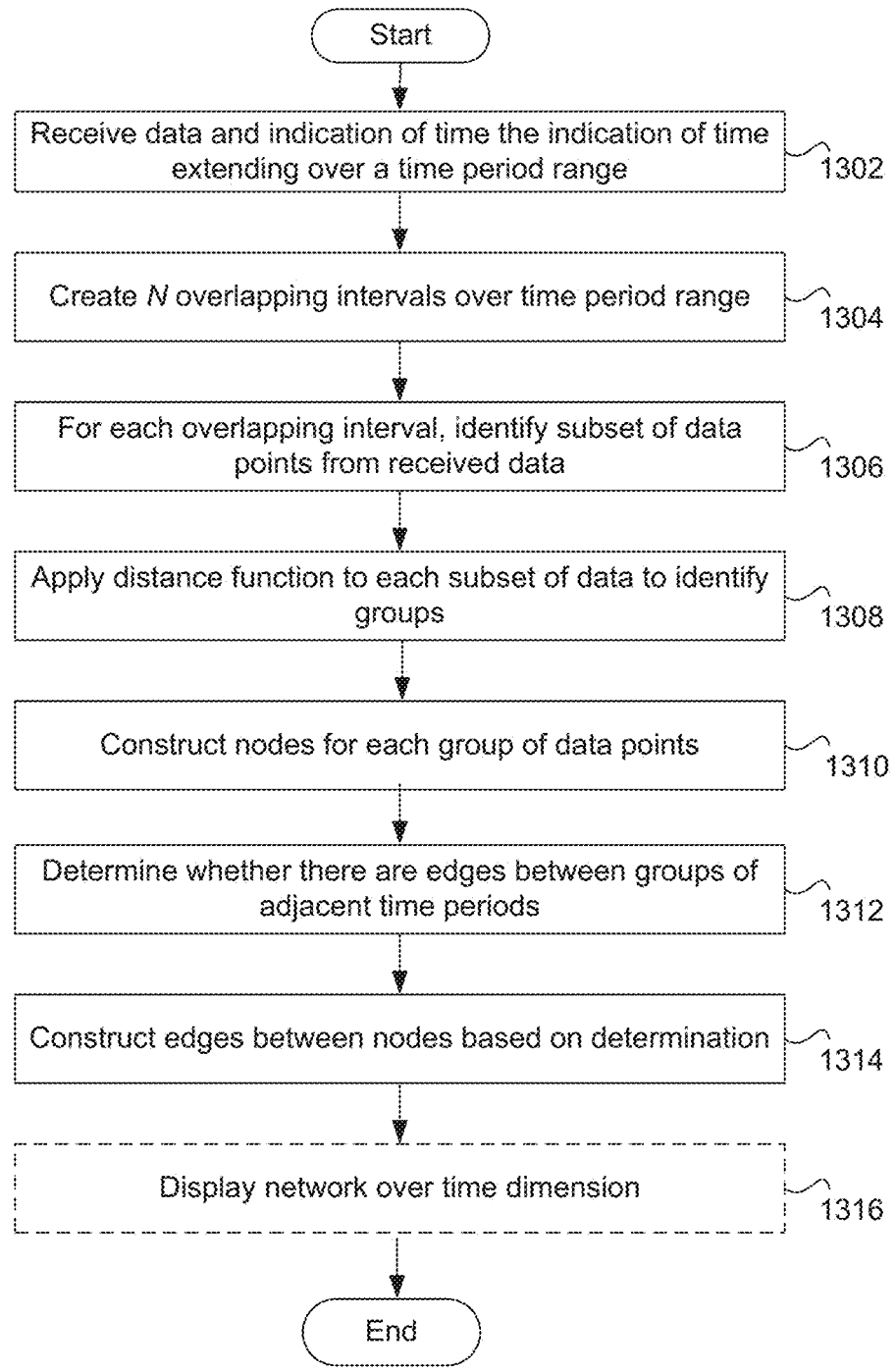
FIG. 13 is a flowchart for constructing a network of nodes and edges representing changing groups of data points over time in some embodiments

FIG. 13 is a flowchart for constructing a network of nodes and edges representing changing groups of data points over time in some embodiments. In step 1302, the data and timeline module 1214 receives data and time information. The time information may extend over a duration of time. The data and timeline module 1214 may structure and/or normalize the received data. The data may be received from any number of sources. In various embodiments, the data and timeline module 1214 may receive one or more distance functions.

In step 1304, the group creation module 1216 may create a family of disjoint subsets within the data using the distance function(s). The groups may be such that their union is the whole data set, but this is not required. In one example, the group creation module 1216 utilizes single linkage clustering with a fixed choice of threshold parameter to be tuned for the data set. It may also be chosen using a particular heuristic based on the associated dendogram.

In another example, the group creation module 1216 may average or perform complete linkage clustering, with a choice of threshold parameter or one based on a particular heuristic. In another example, the group creation module 1216 may create groups by segmenting the networks (e.g., graphs visualized or not visualized) created by TDA.

Groups identified through TDA (e.g., groups of data points that make up a node) may be utilized as groups or sets of data points by the group creation module 1216. For example, as similarly described regarding FIGS. 4-8, the input module 314, input module of the processing module 1212, or the data and timeline module 1214 may receive the data (e.g., Data S). The analysis module 320 or the analysis module of the processing module 1212 may generate reference space R and map similarity space S into reference space R using a selected filter from the analysis module 320 or analysis module of the processing module 1212. The analysis module 320 or the analysis module of the processing module 1212 may generate a cover based on a resolution from the resolution module 318 or the resolution module 1212. The analysis module 320 or the analysis module of the processing module 1212 may cluster data in cover based on metric and data of space S and identify groups that may be utilized as nodes.

In step 1304, the group creation module 1216 creates N intervals. As discussed herein, the group creation module 1216 may receive (e.g., via an interface or within the data) or determine a time period range ($t_0$-$t_1$), a number of overlapping intervals (N), and a resolution (R).

In various embodiments, the group creation module 1216 utilizes one or more of the time period range $t_0$-$t_1$, the overlapping interval number N, and/or the resolution number R to group the data and identify nodes over time. In one example, the group creation module 1216 may create the closed intervals:

$$I_k = \left[t_0 + k\frac{t_1 - t_0}{N} - R, t_0 + (k+1)\frac{t_1 - t_0}{N} + R\right]$$

where k ranges from 0 to N−1. These intervals form a covering of the time period range [$t_0$, $t_1$] by N overlapping intervals.

In steps 1306, the group creation module 1216 identifies a subset of data points for each interval. As discussed herein, For each k, the group creation module 1216 constructs the subset $A_k \subseteq A$ as the set of those elements of A for which the time stamp $t_a$ is in the interval $I_k$. The group creation module 1216 may define $B_k$ for $0 \leq k \leq N-2$ to be the subset of points a for which $t_a$ is in the interval $I_k \cap I_{k+1}$. The group creation module 1216 may apply the group creation method to all of the sets $A_k$ and $B_k$ separately.

In step 1308, the group creation module 1216 may apply one or more distance functions to each subset of data to identify groups. The process of applying the one or more distance functions is further discussed herein.

In step 1310, the group creation module 1216 may construct nodes for each group of data points in each non-overlapping interval and each overlapping interval. In various embodiments, the group creation module 1216 constructs a node for each group. Note that the groups constructed for $A_k$ may intersect the nodes created for $B_{k-1}$ and $B_k$.

In step 1312, the analysis module 1218 determines whether there are edges between groups of adjacent time periods (e.g., nodes in adjacent intervals). As discussed herein, two nodes are adjacent if they are closest in time. For example, a node in a non-overlapping interval is adjacent to a node in the closest overlapping interval. As follows, a node in an overlapping interval is adjacent to a node in the closest non-overlapping interval.

The analysis module 1218 may determine an edge or line between nodes in any number of ways. In various embodiments, the analysis module 1218 scores each pair of groups and compares the score to a threshold to determine an edge or line between nodes associated with the groups. In one example, for each pair of groups $G \subseteq A_k$ and $H \subseteq B_{k-1}$ or $B_k$, the analysis module 1218 computes a score such as a Jaccard score using the ratio:

$$J(G, H) = \frac{\#(G \cap H)}{\#(G \cup H)}$$

The analysis module 1218 may compare J(G, H) to a threshold (e.g., Jaccard threshold $J_0$) to determine an edge between nodes. The analysis module 1218 may, for example, create an edge between any two nodes whose corresponding groups have a Jaccard score greater or equal to the threshold $J_0$.

Each choice of the threshold may generate a different network of nodes and edges (e.g., a different visualization). For example, large values of $J_0$ will give discrete sets of points with no edges. $J_0=0$ will build a network in which every possible edge between nodes in $A_k$ and $B_k$ and $B_{k-1}$ will be filled in, and as a result may not be informative. The threshold can be selected by hand in such a way that the network is not too dense, but yet has enough edges to yield information.

In step 1314, the analysis module 1218 constructs edges between nodes based on the determination (e.g., using the Jaccard score and threshold $J_0$). The analysis module 1218 may construct edges by noting a connection between nodes that satisfies the conditions discussed herein.

In step 1316, the visualization engine 1222 optionally displays the network over a time dimension. An example of the visualization may be found in FIG. 14.

FIG. 14 depicts a visualization in some embodiments. In this diagram, the time period range $t_0$-$t_1$ is divided into four intervals 1402, 1406, 1410, and 1414, with three intersections (e.g., transitions between intervals) 1404, 1408, and 1412. In the first time interval 1402, there is a single node or cluster, labeled "A". The node "A" is a group. Within the intersection (e.g., transition) 1404 of the first and second intervals, the set breaks into two nodes or clusters including node 1416 and node 1418. In this example, each node is connected to node "A" in the adjacent time interval because the Jaccard scores of each node with A are greater than the threshold.

In the second interval 1406, there are three nodes "B", "C", and "D". Two of the nodes (i.e., "B" and "C") correspond to the nodes 1416 and 1418, respectively in the intersection 1404. In this example, there is an edge between node B and node 1416 because the Jaccard score for the pair of nodes "B" and 1416 is greater than the threshold. Similarly, there is an edge between node "C" and node 1418 because the Jaccard score for the pair of nodes "C" and 1418 is greater than the threshold. There is a third node, labelled "D", which does not appear in the previous intersection 1414. This suggests that under the passage of time from the first interval 1402 to the second interval 1406, node "A" splits into the two clusters "B" and "C", and the new node "D" appears.

In the intersection 1408, node "C" shares an edge with node 1420 and node "D" shares an edge with node 1422. Node 1420 shares another edge with node "E" in interval 1410 and node "1422 also shares another edge with node "E." As a result, in the passage from the second interval 1406 to the third interval 1410, node "B" appears to disappear and nodes "C" and "D" merge into node "E".

In the passage from the third interval 1408 to the fourth interval 1414, node "E" is connected with node 1424 in intersection 1412. Node 1424 similarly shares an edge with node "F". As a result, node "E" in interval 1410 appears to corresponds to node "F" in interval 1414. Further, in interval 1414, a new node, labelled "G", appears.

Figure 15:
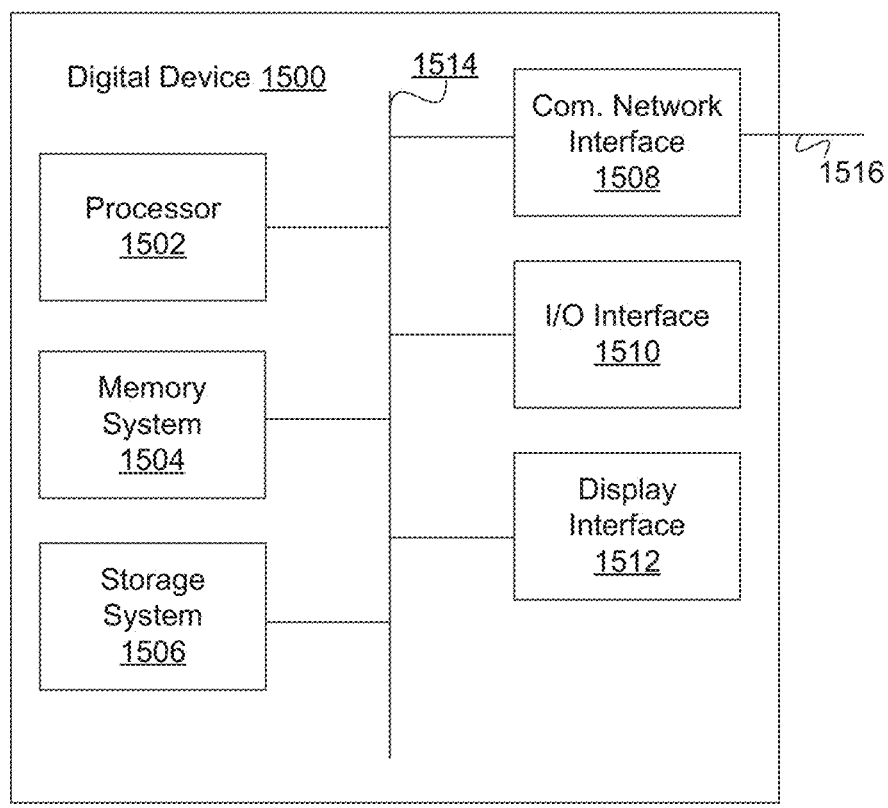
FIG. 15 is a block diagram of an example digital device.

FIG. 15 is a block diagram of an example digital device 1500. The digital device 1500 comprises a processor 1502, a memory system 1504, a storage system 1506, a communication network interface 1508, an I/O interface 1510, and a display interface 1512 communicatively coupled to a bus 1514. The processor 1502 may be configured to execute executable instructions (e.g., programs). In some embodiments, the processor 1502 comprises circuitry or any processor capable of processing the executable instructions.

The memory system 1504 is any memory configured to store data. Some examples of the memory system 1504 are storage devices, such as RAM or ROM. The memory system 1504 can comprise the ram cache. In various embodiments, data is stored within the memory system 1504. The data within the memory system 1504 may be cleared or ultimately transferred to the storage system 1506.

The storage system 1506 is any storage configured to retrieve and store data. Some examples of the storage system 1506 are flash drives, hard drives, optical drives, and/or magnetic tape. In some embodiments, the digital device 1500 includes a memory system 1504 in the form of RAM and a storage system 1506 in the form of flash data. Both the memory system 1504 and the storage system 1506 comprise computer readable media which may store instructions or programs that are executable by a computer processor including the processor 1502.

The communication network interface (com. network interface) 1508 can be coupled to a communication network (e.g., communication network 204) via the link 1516. The communication network interface 1508 may support communication over an Ethernet connection, a serial connection, a parallel connection, or an ATA connection, for example. The communication network interface 1508 may also support wireless communication (e.g., 1502.11 a/b/g/n, WiMax). It will be apparent to those skilled in the art that the communication network interface 1508 can support many wired and wireless standards.

The optional input/output (I/O) interface 1510 is any device that receives input from the user and output data. The optional display interface 1512 is any device that may be configured to output graphics and data to a display. In one example, the display interface 1512 is a graphics adapter.

It will be appreciated by those skilled in the art that the hardware elements of the digital device 1500 are not limited to those depicted in FIG. 15. A digital device 1500 may comprise more or less hardware elements than those depicted. Further, hardware elements may share functionality and still be within various embodiments described herein. In one example, encoding and/or decoding may be performed by the processor 1502 and/or a co-processor located on a GPU.

The above-described functions and components can be comprised of instructions that are stored on a storage medium (e.g., a computer readable storage medium). The instructions can be retrieved and executed by a processor. Some examples of instructions are software, program code, and firmware. Some examples of storage medium are memory devices, tape, disks, integrated circuits, and servers. The instructions are operational when executed by the processor (e.g., a data processing device) to direct the processor to operate in accord with embodiments of the present invention. Those skilled in the art are familiar with instructions, processor(s), and storage medium.

The present invention has been described above with reference to example embodiments. It will be apparent to those skilled in the art that various modifications may be made and other embodiments can be used without departing from the broader scope of the invention. Therefore, these and other variations upon the example embodiments are intended to be covered by the present invention.

What is claimed is:

1. A non-transitory computer readable medium including executable instructions, the instructions being executable by a processor to perform a method, the method comprising:
  receiving a data set, each data point in the data set including an indication of time, and receiving a distance function to be utilized on the data points of the data set;
  determining overlapping time intervals over a time period range, the time period range including the indications of time of the data points in the data set;
  identifying subsets of data in each overlapping time interval based, at least in part, on the indications of time;
  applying the distance function within a topological data analysis using data features of each subset of data to identify groups to identify one or more nodes in each subset of the data;
  constructing a node for each group to create a plurality of nodes;
  determining if two nodes of the plurality of nodes in adjacent time periods are connected by scoring shared data point membership between the two nodes of the plurality of nodes and comparing a score of the shared data point membership to a threshold; and
  displaying at least two nodes of the plurality of nodes with an indication of a passage of time, the two nodes being in adjacent time periods, the two nodes being connected by a line if the score of the shared data point membership between the two nodes of the plurality of nodes is greater than the threshold, one of the two nodes being a new node that appears later in time relative to the other node of the two nodes if the score of the shared data point membership between the two nodes is less than the threshold.

2. The non-transitory computer readable medium of claim 1, the indications of time being time stamps.

3. The non-transitory computer readable medium of claim 1, wherein determining overlapping intervals over a time period range is determined based on a number of overlapping intervals and a resolution value received from a user.

4. The non-transitory computer readable medium of claim 1, wherein determining overlapping intervals over a time period range is determined based on a number of overlapping intervals and a resolution value, the number of overlapping intervals being determined based on the received data set.

5. The non-transitory computer readable medium of claim 1, wherein scoring shared data point membership between the two nodes of the plurality of nodes comprises determining a Jaccard score of the shared data point membership between the two nodes of the plurality of nodes.

6. The non-transitory computer readable medium of claim 1, wherein the time period range is received from a user.

7. The non-transitory computer readable medium of claim 1, wherein the time period range is shorter than a range of time indicated by the indications of time.

8. The non-transitory computer readable medium of claim 1, the method further comprising filtering the data set based on one or more features and wherein each node is constructed based on the data set after filtering.

9. The method comprising:
receiving a data set, each data point in the data set including an indication of time, and receiving a distance function to be utilized on the data points of the data set;
determining overlapping time intervals over a time period range, the time period range including the indications of time of the data points in the data set;
identifying subsets of data in each overlapping time interval based, at least in part, on the indications of time;
applying the distance function within a topological data analysis using data features of each subset of data to identify groups to identify one or more nodes in each subset of the data;
constructing a node for each group to create a plurality of nodes;
determining if two nodes of the plurality of nodes in adjacent time periods are connected by scoring shared data point membership between the two nodes of the plurality of nodes and comparing a score of the shared data point membership to a threshold; and
displaying at least two nodes of the plurality of nodes with an indication of a passage of time, the two nodes being in adjacent time periods, the two nodes being connected by a line if the score of the shared data point membership between the two nodes of the plurality of nodes is greater than the threshold, one of the two nodes being a new node that appears later in time relative to the other node of the two nodes if the score of the shared data point membership between the two nodes is less than the threshold.

10. The method of claim 9, the indications of time being time stamps.

11. The method of claim 9, wherein determining overlapping intervals over a time period range is determined based on a number of overlapping intervals and a resolution value received from a user.

12. The method of claim 9, wherein determining overlapping intervals over a time period range is determined based on a number of overlapping intervals and a resolution value, the number of overlapping intervals being determined based on the received data set.

13. The method of claim 9, wherein scoring shared data point membership between the two nodes of the plurality of nodes comprises determining a Jaccard score of the shared data point membership between the two nodes of the plurality of nodes.

14. The method of claim 9, wherein the time period range is received from a user.

15. The method of claim 9, wherein the time period range is shorter than a range of time indicated by the indications of time.

16. The method of claim 9, the method further comprising filtering the data set based on one or more features and wherein each node is constructed based on the data set after filtering.

17. A system comprising:
a processor; and
a memory including instructions to configure the processor to:
receive a data set, each data point in the data set including an indication of time, and receive a distance function to be utilized on the data points of the data set;
determine overlapping time intervals over a time period range, the time period range including the indications of time of the data points in the data set;
identify subsets of data in each overlapping time interval based, at least in part, on the indications of time;
apply the distance function within a topological data analysis using data features of each subset of data to identify groups to identify one or more nodes in each subset of the data;
construct a node for each group to create a plurality of nodes;
determine if two nodes of the plurality of nodes in adjacent time periods are connected by scoring shared data point membership between the two nodes of the plurality of nodes and comparing a score of the shared data point membership to a threshold; and
display at least two nodes of the plurality of nodes with an indication of a passage of time, the two nodes being in adjacent time periods, the two nodes being connected by a line if, the score of the shared data point membership between the two nodes of the plurality of nodes is greater than the threshold, one of the two nodes being a new node that appears later in time relative to the other node of the two nodes if the score of the shared data point membership between the two nodes is less than the threshold.

* * * * *